(12) United States Patent
Ooe

(10) Patent No.: US 8,459,438 B2
(45) Date of Patent: Jun. 11, 2013

(54) WORKPIECE CONVEYANCE DEVICE

(75) Inventor: Masahiro Ooe, Shiga (JP)

(73) Assignee: Daifuku Co., Ltd. (JP)

( * ) Notice: Subject to any disclaimer, the term of this patent is extended or adjusted under 35 U.S.C. 154(b) by 0 days.

(21) Appl. No.: 13/559,239

(22) Filed: Jul. 26, 2012

(65) Prior Publication Data
US 2012/0285797 A1 Nov. 15, 2012

Related U.S. Application Data

(63) Continuation of application No. PCT/JP2011/050875, filed on Jan. 19, 2011.

(30) Foreign Application Priority Data

Mar. 26, 2010 (JP) .................................. 2010-071858

(51) Int. Cl.
*B65G 47/52* (2006.01)
(52) U.S. Cl.
USPC ................ 198/345.1; 198/346.1; 198/370.08; 198/465.1
(58) Field of Classification Search
None
See application file for complete search history.

(56) References Cited

U.S. PATENT DOCUMENTS

| | | | |
|---|---|---|---|
| 5,540,319 A | | 7/1996 | Orisaka et al. |
| 6,505,726 B1 * | | 1/2003 | Baulier ...................... 198/345.1 |

FOREIGN PATENT DOCUMENTS

| | | | |
|---|---|---|---|
| CA | 2128918 A1 | | 1/1995 |
| DE | 4426826 A1 | | 2/1995 |
| GB | 2280409 A | | 2/1995 |
| GB | 2302072 A | | 1/1997 |
| JP | 4362459 A | | 12/1992 |
| JP | 7041161 A | | 2/1995 |
| JP | 07041161 A | * | 2/1995 |
| JP | 2000229727 A | | 8/2000 |
| JP | 2009051289 A | | 3/2009 |
| JP | 2011088697 A | | 5/2011 |

OTHER PUBLICATIONS

International Search Report; Application No. PCT/JP2011/050875; Issued; Apr. 4, 2011; Mailing Date: Apr. 12, 2012; 1 page.

* cited by examiner

*Primary Examiner* — Kavel Singh
(74) *Attorney, Agent, or Firm* — St. Onge Steward Johnston & Reens LLC

(57) ABSTRACT

Workpiece conveyance device employs a workpiece conveying traveling body composed of a workpiece support carriage supporting a longitudinal central portion of a workpiece and two auxiliary carriages and positioned below both longitudinal end portions of the workpiece. The workpiece support carriage includes a workpiece high-position supporting means switchable between a rising posture of supporting the workpiece at a high position and a folded posture. The two auxiliary carriages nd include workpiece low-position supporting means and to support front and rear two places in the longitudinal direction of the workpiece at a height higher than the workpiece high-position supporting means in the folded posture.

7 Claims, 15 Drawing Sheets

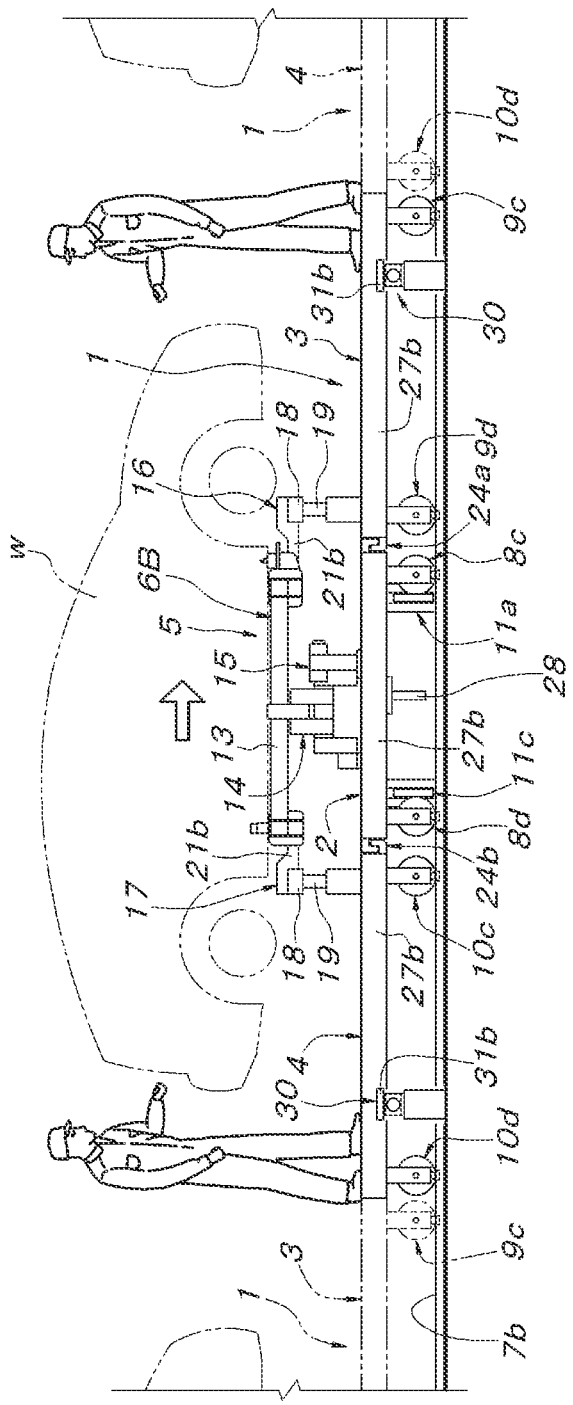
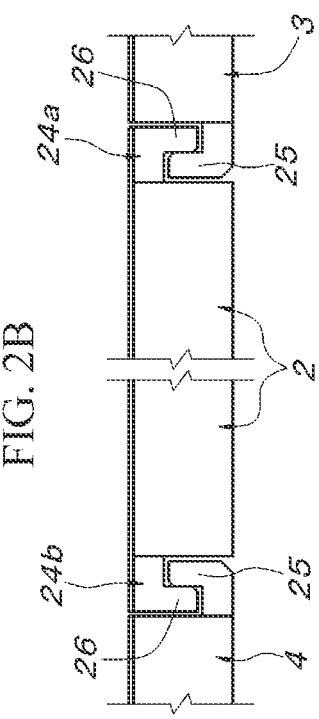
FIG. 2A
FIG. 2B

WORKPIECE CONVEYANCE DEVICE

CROSS-REFERENCE TO RELATED APPLICATIONS

The present application is a continuation of pending International patent application PCT/JP2011/050875 filed on Jan. 19, 2011 which designates the United States and claims priority from Japanese Patent Application 2010-071858 filed on Mar. 26, 2010, the content of which is incorporated herein by reference.

FIELD OF THE INVENTION

The present invention relates to workpiece conveyance device whose workpiece conveying path includes a first conveying path and a second conveying path branched off perpendicularly and horizontally with respect to the first conveying path.

BACKGROUND OF THE INVENTION

The above workpiece conveyance device is known in automobile assembly lines, for example. In automobile assembly lines, the first conveying path is used as a trim line or final line where work with respect to a relatively low region of the periphery of an automobile body having been supported on a workpiece conveying traveling body is performed, by driving the workpiece conveying traveling body to travel in a longitudinal orientation parallel to the front-rear direction of the supported automobile body. The second conveying path is used as a chassis line where work of assembling an engine or an axle unit from beneath the automobile body having been supported on the workpiece conveying traveling body is performed, by driving the workpiece conveying traveling body to travel in a transverse orientation orthogonal to the front-rear direction of the supported automobile body. As the workpiece conveying traveling body usable in such workpiece conveyance device, there have been known a variable-length conveying carriage provided with auxiliary stands before and after a workpiece support carriage which slidably move in and out as described in Patent Document 1 and a variable-length conveying carriage pivotally supporting auxiliary stands before and after a workpiece support carriage so as to rise and fall.

Patent Document 1: Japanese Published Unexamined Patent Application No. H04-362459

However, in the conventional and known variable-length workpiece conveying traveling body as described above, not only does the structure of the workpiece conveying traveling body required in large numbers of the entire equipment become complicated thereby leading to high cost as the entire equipment, but also the size of the auxiliary stands is inevitably restricted since the auxiliary stands are accommodated in a carriage main body or switched into a hanging posture, so that the effectiveness of the auxiliary stands is reduced. Further, a means for taking out and in the auxiliary stands with respect to the carriage main body and control for automatically operating the means become necessary at a branching point from the first conveying path to the second conveying path or at a meeting point from the second conveying path to the first conveying path. In this respect, cost of the entire equipment also becomes significantly higher. In order to solve such problems, proposed is conveyance device in which the workpiece conveying traveling body is composed of a workpiece support carriage which supports a longitudinal central portion of an automobile body whose longitudinal direction is parallel to the first conveying path and front and rear two auxiliary carriages which adjoin the front and rear in the traveling direction of the first conveying path of the workpiece support carriage and are positioned below both longitudinal end portions of the automobile body, and the workpiece support carriage and the two auxiliary carriages are driven to travel linearly and integrally on the first conveying path, and only the workpiece support carriage having been laterally extracted from between the front and rear two auxiliary carriages is driven to travel perpendicularly and horizontally on the second conveying path.

In the new workpiece conveyance device in which the workpiece conveying traveling body is composed of a workpiece support carriage and two auxiliary carriages arranged before and after the workpiece support carriage as described above, also, on the first conveying path, the automobile body needs to be supported at a low position where a variety of works with respect to the periphery of the automobile body (the workpiece) can be performed easily, and on the second conveying path, the automobile body needs to be supported at a position high enough for a worker to enter under the automobile body. In order to solve such problems, it is conceived in the above proposal that a workpiece support means provided on the workpiece support carriage is configured to be able to support the automobile body at any height from a high position to a low position.

SUMMARY OF THE INVENTION

Problems to be Solved by the Invention

In order to configure such that the automobile body (the workpiece) can be supported at any height from a low position to a high position by one workpiece support means as described above, for example an elevating workpiece support means including workpiece support tools which move up and down along columns erected at both lateral sides of the automobile body becomes necessary. Although the elevating workpiece support means can support the automobile body at a low position near to a carriage floor surface, the columns of a large size placed at both lateral sides of the automobile body constitute a hindrance to a variety of works with respect to the periphery of the automobile body. As a matter of course, it is conceivable that the columns are integrated with the workpiece support tools and configured to be vertically movable with respect to the carriage floor surface under their supporting automobile body. However, there are many practical problems such as a high space under the carriage becomes necessary, so that the carriage cannot have a low-floor structure or a deep groove-shaped pit needs to be formed along the traveling path.

Means for Solving the Problems

The present invention proposes workpiece conveyance device capable of solving the afore-described conventional problems. The workpiece conveyance device according to the present invention as set forth in claim 1 includes, described with reference symbols in parentheses of embodiments which will be described later, a workpiece conveying path including a first conveying path (L1) and a second conveying path (L3) branched off perpendicularly and horizontally with respect to the first conveying path (L1), a workpiece conveying traveling body (1) composed of a workpiece support carriage (2) which supports a longitudinal central portion of a workpiece (W) whose longitudinal direction is parallel to the first conveying path (L1) and two auxiliary carriages (3 and 4) which adjoin the front and rear in a traveling direction of the first conveying path (L1) of the workpiece support carriage (2) and are positioned below both longitudinal end portions of the workpiece (W), a workpiece conveying traveling body driving means (30) juxtaposed on the first conveying path (L1) to drive the workpiece support carriage (2) and the auxiliary carriages (3 and 4) to travel integrally, a carriage diverging means (32a, 32b, and 33) arranged at a branching point between the first conveying path (L1) and the second conveying path (L3) so as to leave the two auxiliary carriages (3 and 4) on the first conveying path (L1) and to diverge and introduce only the workpiece support carriage (2) perpendicularly and horizontally into the second conveying path (L3), and a workpiece support carriage driving means (39) juxtaposed on the second conveying path (L3) to drive the workpiece support carriage (2) to travel perpendicularly and horizontally with respect to the traveling direction of the workpiece support carriage (2) on the first conveying path (L1), wherein the workpiece support carriage (2) is provided with a workpiece high-position supporting means (5) configured to be switchable between a rising posture of supporting the workpiece (W) at a high position and a fallen-down folded posture under the workpiece (W) and on the workpiece support carriage (2), and the two auxiliary carriages (3 and 4) are provided with workpiece low-position supporting means (16 and 17) configured to individually support front and rear two places in the longitudinal direction of the workpiece (W) under the workpiece (W) and at a height higher than the workpiece high-position supporting means (5) in the folded posture.

When the afore-described present invention is carried out, more specifically as set forth in claim 2, it can be configured such that the workpiece high-position supporting means (5) on the workpiece support carriage (2) is moved up and down by a lifter located alongside the traveling path while supporting the workpiece (W) and the workpiece high-position supporting means (5) is provided with a lock means (15) to lock in the rising posture of supporting the workpiece (W) at a high position.

The workpiece low-position supporting means (16 and 17) on the auxiliary carriages (3 and 4) may directly support the workpiece (W). However, as set forth in claim 3, the workpiece low-position supporting means (16 and 17) can be configured to support the workpiece (W) via the workpiece high-position supporting means (5) on the workpiece support carriage (2). Further, as set forth in claim 4, the workpiece low-position supporting means (16 and 17) on the auxiliary carriages (3 and 4) can be of a variable-support-height structure which can support the workpiece (W) at a plurality of heights higher than the workpiece high-position supporting means (5) in the folded posture. As set forth in claim 5, it can be configured that the workpiece low-position supporting means (16 and 17) are composed of vertically movable support members (18) and these support members (18) are held at a workpiece support height by cam rails (66a to 67b) laid on the traveling path side.

Additionally, the workpiece low-position supporting means (16 and 17) on the auxiliary carriages (3 and 4) can be provided with workpiece support bodies (68 to 70) which are pivotally supported on the auxiliary carriages (3 and 4) so as to rise and fall. In this case, as set forth in claim 6, the workpiece support bodies (68 to 70) can be continuously provided with contact portions (68b to 70b) which abut on the adjacent workpiece support carriage (2) when the workpiece support bodies (68 to 70) are in a workpiece supporting posture.

Effects of the Invention

According to the configuration of the present invention as set forth in claim 1, a transshipment of the workpiece (the automobile body) between the first and second conveying paths becomes unnecessary by using the first conveying path as a trim line or final line of an automobile assembly line and the second conveying path as a chassis line. Furthermore, the workpiece is conveyed by a long workpiece conveying traveling body formed by the workpiece support carriage and the front and rear two auxiliary carriages adjacent thereto on the first conveying path where the workpiece is fed longitudinally in parallel with a front-rear length direction thereof. Thus, a sufficiently large working floor over an entire periphery of the workpiece can be ensured on the workpiece conveying traveling body, and required works on the first conveying path with respect to the periphery of the workpiece can be performed safely and easily by a worker who gets on the workpiece conveying traveling body. On the second conveying path, only the workpiece support carriage short in front-rear length with the front and rear two auxiliary carriages removed supports and conveys the workpiece while oriented transversely. As a result, it also becomes possible to carry out the work without making the attachment-loaded carriages to be entered under the front and rear of the workpiece get on and off the conveying carriage.

Furthermore, according to the configuration of the present invention, two places in the front-rear longitudinal direction of the workpiece can be supported from beneath the workpiece individually by the workpiece low-position supporting means provided to the front and rear two auxiliary carriages and the workpiece high-position supporting means provided to the central workpiece support carriage can be folded down under the workpiece, when the workpiece is supported at a low height on the first conveying path. In other words, the workpiece support carriage can be provided with such a workpiece supporting means that can support the workpiece at a high position only when being in the rising posture and can be folded down under the workpiece when not supporting the workpiece and that requires no elevating guide columns. As a result, such elevating guide columns, etc., that constitute a hindrance to works need not be placed at the periphery of the workpiece having been supported at a low position. A variety of works with respect to the periphery of the workpiece having been supported at a low position can be performed safely and easily.

When the workpiece having been supported at a high position is conveyed perpendicularly and horizontally on the second conveying path, the workpiece low-position supporting means having supported the two places in the front-rear longitudinal direction of the workpiece are removed together with the auxiliary carriages. Thus, the workpiece low-position supporting means do not constitute a hindrance to a variety of works performed by a worker entering under the workpiece as in the case when the workpiece low-position supporting means are placed on the carriage floor surface under both front and rear end portions of the workpiece having been supported at a high position. A variety of works to the lower part of the workpiece having been supported at a high position can also be performed safely and easily.

It is noted that the workpiece high-position supporting means on the workpiece support carriage may be switched between the folded and rising postures by being driven by juxtaposed actuators. According to the configuration as set forth in claim 2, however, no driving actuators for the workpiece high-position supporting means are required on the workpiece support carriage, and thus, the structure is simple and can be carried out inexpensively. The workpiece high-position supporting means can be configured to have a structure that the workpiece support portions vertically move up and down and to support the workpiece even in the folded posture. In this case, the workpiece support height of the workpiece high-position supporting means in the folded posture is designed to be the lowest height lower than that of the workpiece low-position supporting means of the auxiliary carriages. By properly using the workpiece high-position supporting means of the workpiece support carriage and the workpiece low-position supporting means of the auxiliary carriages, the workpiece can be supported at low positions of at least two, upper and lower levels.

When the workpiece low-position supporting means on the auxiliary carriages are configured to support the workpiece directly, the workpiece needs to be provided with a supported portion to be supported by the workpiece high-position supporting means and a supported portion to be supported by the workpiece low-position supporting means. According to the configuration as set forth in claim 3, however, the need to provide the workpiece with a supported portion to be supported by the workpiece low-position supporting means is eliminated. As a result, the implementation of the equipment of the present invention is facilitated.

Further, as described above, the workpiece can be supported at low positions of at least two, upper and lower levels if the workpiece high-position supporting means is configured to be able to support the workpiece even when being in the folded posture. However, even in the structure that the workpiece high-position supporting means cannot support the workpiece when being in the folded posture, the workpiece can be supported at a plurality of heights higher than the workpiece high-position supporting means in the folded posture according to the configuration as set forth in claim 4. Thus, the workpiece support height is changed in accordance with details of works to the periphery of the workpiece, and workability with respect to the periphery of the workpiece can be improved.

The workpiece low-position supporting means of the auxiliary carriages can be configured to be variable in workpiece support height by juxtaposed driving actuators or to be switchable between a workpiece supporting posture and a workpiece non-supporting posture (a retreat posture). According to the configuration as set forth in claim 5, however, not only do driving actuators for the workpiece low-position supporting means become unnecessary on the auxiliary carriages but also the workpiece support height can be rendered variable by height of the cam rails. Further, there is no need to temporarily stop the auxiliary carriages at a fixed position corresponding to the driving actuators on the traveling path side as in the case when driving actuators for the workpiece low-position supporting means are provided on the traveling path side. The workpiece support height of the workpiece low-position supporting means can be changed during traveling of the auxiliary carriages.

In addition, according to the configuration as set forth in claim 6, the workpiece low-position supporting means can be easily constituted by workpiece support bodies pivotally supported on the auxiliary carriages so as to rise and fall. Furthermore, the load acted upon the end portions of the auxiliary carriages due to that the workpiece support bodies support the workpiece is supported on the both front and rear end portions of the workpiece support carriage, thereby allowing for preventing a large overturning moment from being exerted upon the auxiliary carriages. Thus, the configuration of the auxiliary carriages is simplified and can be carried out inexpensively.

BRIEF DESCRIPTION OF THE DRAWINGS

FIG. 2A is a side view of the same;

FIG. 2B is a side view showing a connecting means between a workpiece support carriage and auxiliary carriages of the workpiece conveying traveling body;

DETAILED DESCRIPTION OF THE INVENTION

Figure 1:
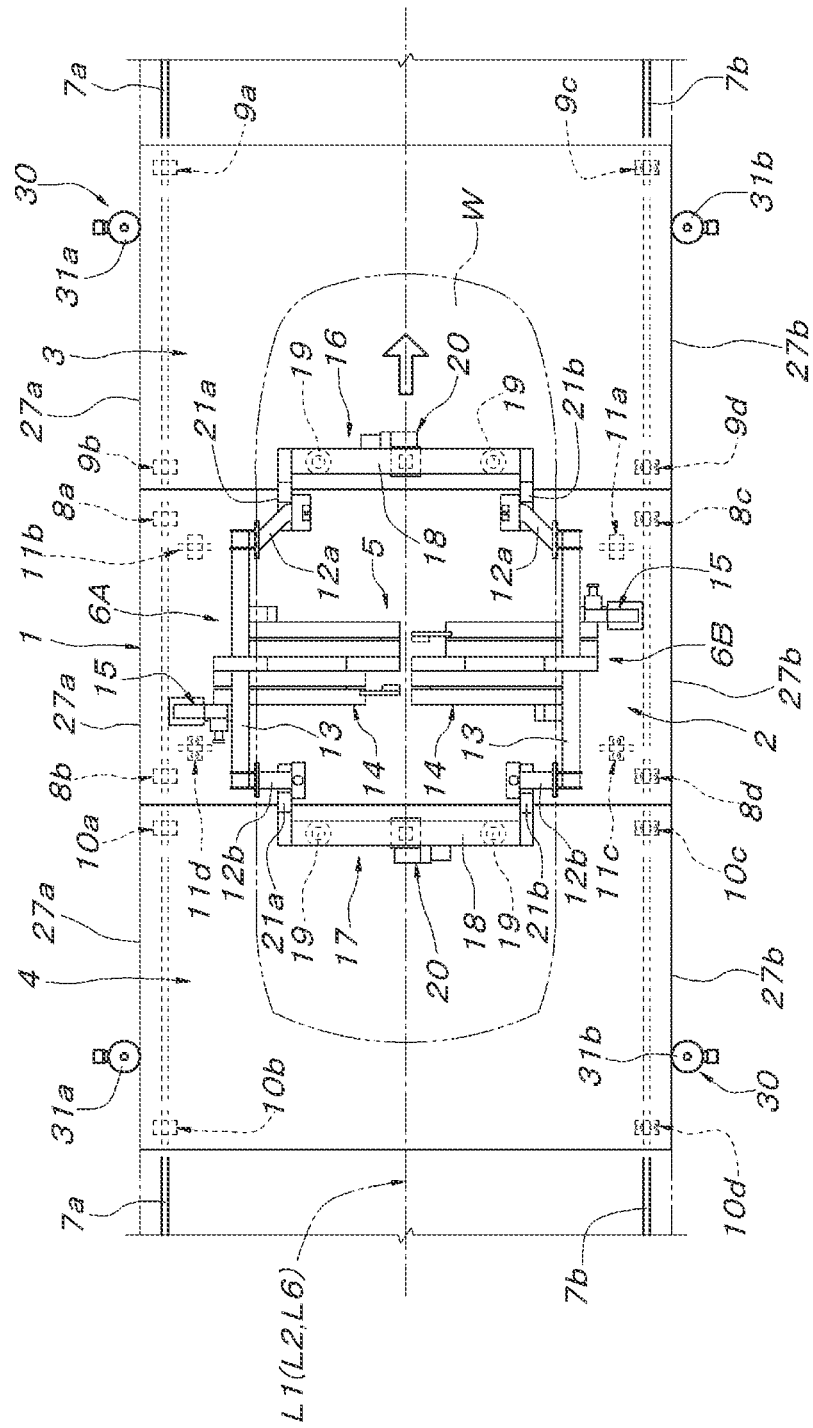
FIG. 1 is a plan view when a workpiece conveying traveling body is on a first conveying path.
Figure 3:
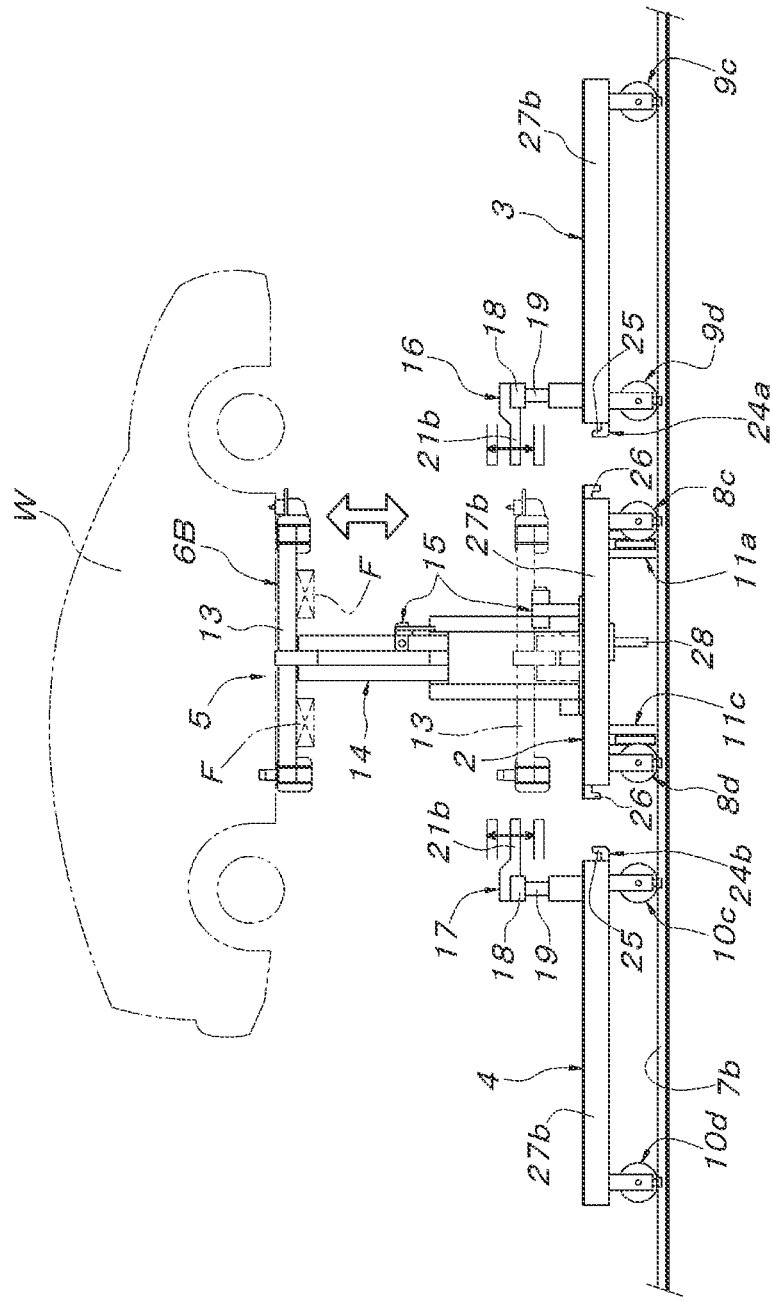
FIG. 3 is a side view where the workpiece support carriage and front and rear auxiliary carriages of the workpiece conveying traveling body are separated from each other.

As shown in FIGS. 1 to 3, a workpiece conveying traveling body 1 in this embodiment is constituted by a central workpiece support carriage 2 and two auxiliary carriages 3 and 4 arranged adjacent to the front and rear in a traveling direction of a first conveying path L1 of the workpiece support carriage 2. The workpiece support carriage 2 has such a horizontally long rectangular shape in plan that a width in a lateral direction is greater than a length in the traveling direction of the first conveying path L1. The workpiece support carriage 2 has an upper surface installed with a workpiece high-position supporting means 5 to support a workpiece (an automobile body) W at a high position. The workpiece high-position supporting means 5 is composed of a pair of left and right elevating support units 6A and 6B respectively supporting both lateral sides of the workpiece W. The workpiece W having been supported by the workpiece high-position supporting means 5 has both front and rear end portions projecting forward and rearward from the workpiece support carriage 2. Further, a working floor with a width enough for a worker to walk around is ensured between the workpiece high-position supporting means 5 positioned outside both lateral sides of the workpiece W and both lateral sides of the workpiece support carriage 2, when viewed in plan.

The front and rear two auxiliary carriages 3 and 4 have the same size, and a lateral width thereof is equal to that of the workpiece support carriage 2 and a length thereof in the traveling direction of the first conveying path L1 is long enough to protrude more forwardly and rearwardly outward than both the front and rear ends of the workpiece W projecting forward and rearward from the workpiece support carriage 2 when viewed in plan and enough to ensure a working floor as large as a worker can walk outside both the front and rear ends of the workpiece W.

The workpiece support carriage 2 and the front and rear two auxiliary carriages 3 and 4 have respective four corners of the bottom portion arranged with longitudinal movement wheel units 8a to 8d, 9a to 9d, and 10a to 10d for supporting the workpiece support carriage 2 and the front and rear two auxiliary carriages 3 and 4 on a pair of left and right guide rails 7a and 7b laid along the first conveying path L1 and for allowing the carriages to travel only in a direction along the guide rails 7a and 7b. In addition to the afore-described longitudinal movement wheel units 8a to 8d, the workpiece support carriage 2 is arranged with lateral movement wheel units 11a to 11d for traveling perpendicularly and horizontally with respect to the traveling direction of the first conveying path L1, at positions inner and nearer to the center with respect to the respective longitudinal movement wheel units 8a to 8d. These lateral movement wheel units 11a to 11d are of the same configuration as the longitudinal movement wheel units 8a to 8d and arranged as the orientation thereof is changed perpendicularly into the horizontal direction.

Figure 4:
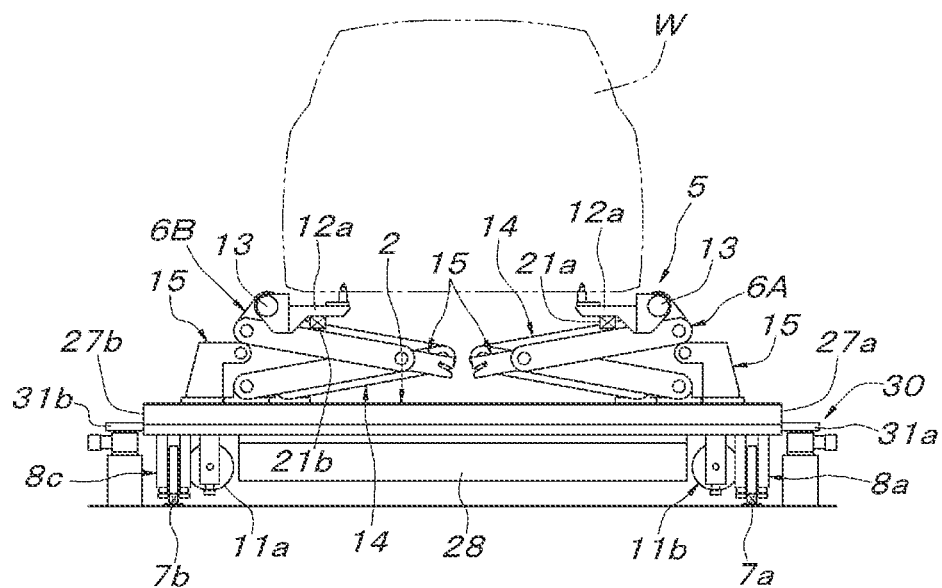
FIG. 4 is a front view showing the workpiece support carriage of the workpiece conveying traveling body on the first conveying path.
Figure 11:
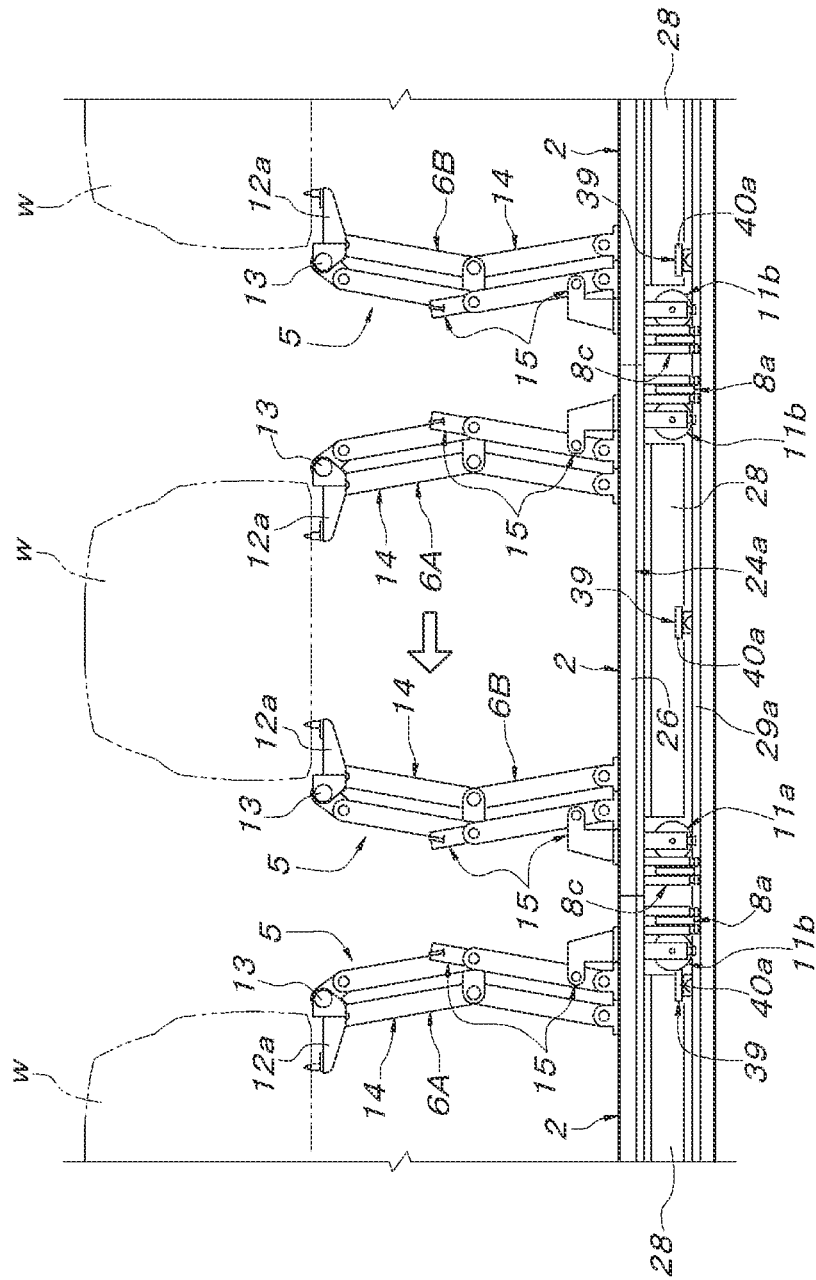
FIG. 11 is a side view of the same.

The paired elevating support units 6A and 6B constituting the workpiece high-position supporting means 5 on the workpiece support carriage 2 are symmetric with respect to each other. The elevating support units 6A and 6B are composed of rod-shaped support members 13 positioned parallel to the longitudinal direction of the workpiece W and close to both lateral sides of the workpiece W and foldable center-folding double link mechanisms 14 for supporting longitudinal central portions of the rod-shaped support members 13 and vertically and parallelly moving up and down the rod-shaped support members 13. The rod-shaped support members 13 have both longitudinal end portions provided with inwardly projecting workpiece support arms 12a and 12b. The paired left and right elevating support units 6A and 6B can be switched between a rising posture of holding the workpiece W having been supported by the workpiece support arms 12a and 12b at a position high enough for a worker to enter under the workpiece W as shown in FIG. 3 and FIG. 11 and a fallen-down folded posture under the workpiece W and on the workpiece support carriage 2 while the center-folding double link mechanisms 14 are folded inward as shown in FIG. 4. The elevating support units 6A and 6B in the rising posture are locked by a lock means 15 and then can stably support the workpiece W at the high position.

Figure 5:
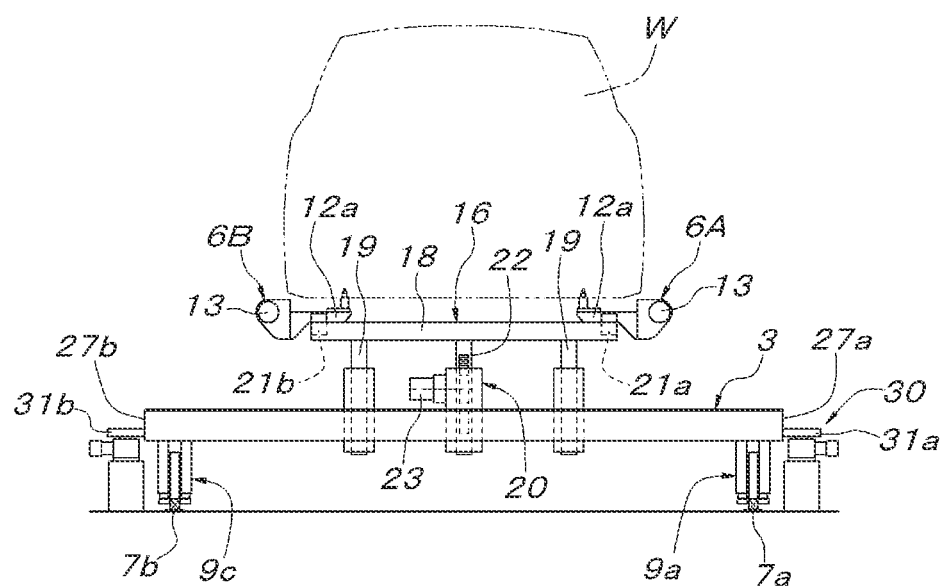
FIG. 5 is a front view of the auxiliary carriage of the same.

On the other hand, the front and rear two auxiliary carriages 3 and 4 have end portions adjacent to the workpiece support carriage 2, on which end portions workpiece low-position supporting means 16 and 17 for supporting the workpiece W at a low position are provided. The workpiece low-position supporting means 16 and 17 are symmetric with respect to each other and configured in such a manner that rod-shaped support members 18 parallel to the lateral width direction of the workpiece W can be supported by a pair of left and right elevation guide rods 19 and be vertically and parallelly moved up and down by elevation drive means 20 and that a pair of left and right support arms 21a and 21b are projected from the rod-shaped support members 18 toward the workpiece support carriage 2. The elevation drive means 20 may be of any structure. The one in this embodiment is, as shown in FIG. 5, composed of an elevation driving rod 22 vertically movably supported with respect to the auxiliary carriage 3 or 4 and having an upper end joined to the rod-shaped support member 18, a rack gear provided to the elevation driving rod 22, a pinion gear meshed with the rack gear, and a speed reducer equipped motor 23 rotating and driving the pinion gear in forward and reverse directions. The elevation drive means 20 can move up and down the rod-shaped support member 18 via the elevation driving rod 22 by an operation of the speed reducer equipped motor 23 and stop and hold the rod-shaped support member 18 at any height.

Further, connecting means 24a and 24b as shown in FIG. 2B are respectively provided to adjacent end portions of the workpiece support carriage 2 and auxiliary carriages 3 and 4. The connecting means 24a and 24b are composed of engaged members 25 projecting from the end portions of the auxiliary carriages 3 and 4 across the entire width thereof and having an L shape in longitudinal section, and engaging members 26 projecting from both ends of the workpiece support carriage 2 across the entire width thereof, being fitted to the engaged members 25 of the auxiliary carriages 3 and 4 from above, and having an inverted L shape in longitudinal section. The engaging members 26 are configured to be vertically fittable to and separable from the engaged members 25 and also relatively fittable and separable in the lateral width direction of the respective carriages 2 to 4.

Additionally, respective left and right lateral surfaces of the workpiece support carriage 2 and auxiliary carriages 3 and 4, which both lateral surfaces are parallel to the traveling direction of the first conveying path L1, serve as longitudinal movement friction drive surfaces 27a and 27b. A friction driving strip plate member 28 perpendicular and horizontal to the traveling direction of the first conveying path L1 is projected in the center of the bottom portion of the workpiece support carriage 2, aside from the longitudinal movement friction drive surfaces 27a and 27b.

Figure 6:
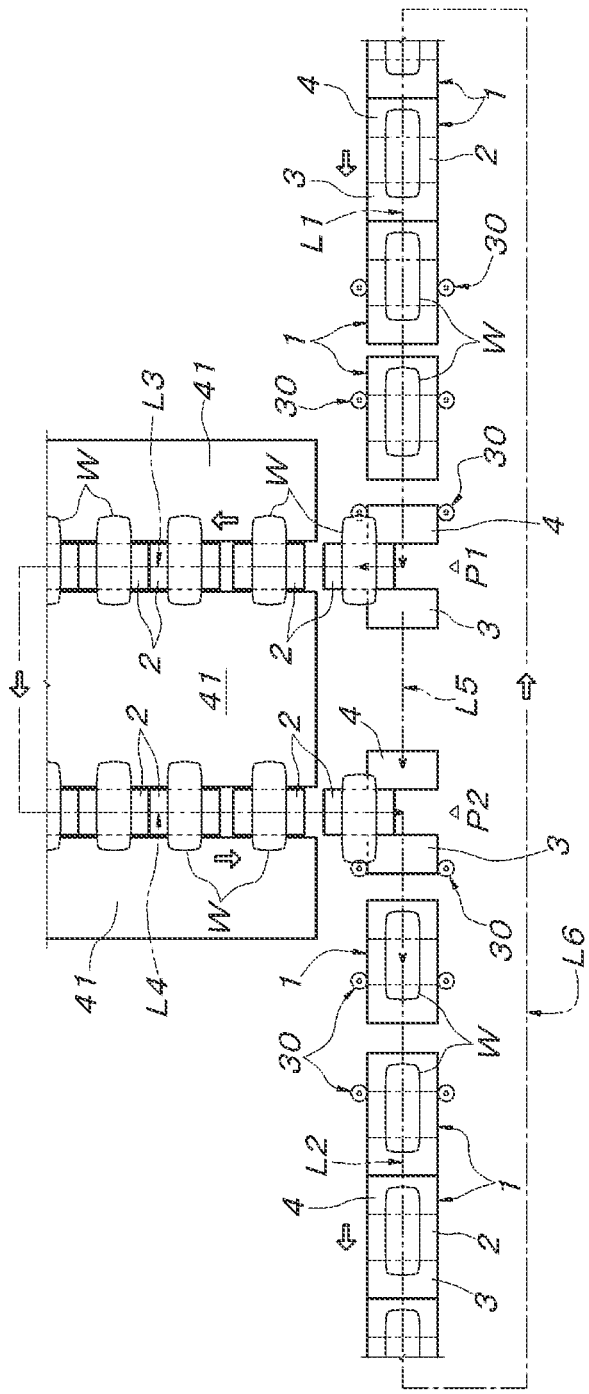
FIG. 6 is a plan view explaining a layout of entire workpiece conveyance device.

Subsequently, a workpiece conveying path where the workpiece conveying traveling body 1 configured as above travels will be described. As shown in FIG. 6, the workpiece conveying path in this embodiment includes an upstream first conveying path L1 and a downstream first conveying path L2 in series in the same straight line, an outbound second conveying path L3 perpendicularly and horizontally branched off from a terminal end of the upstream first conveying path L1, and an inbound second conveying path L4 connected to a terminal end of the outbound second conveying path L3 and perpendicularly joining a beginning end of the downstream first conveying path L2. Further, a linear auxiliary carriage traveling path L5 is constructed between a branching point P1 from the upstream first conveying path L1 to the outbound second conveying path L3 and a meeting point P2 from the inbound second conveying path L4 to the downstream first conveying path L2. When the workpiece conveying path is used as an automobile assembly line, the upstream first conveying path L1 can be used as a trim line, and the outbound and inbound second conveying paths L3 and L4 can be used as a chassis line, and the downstream first conveying path L2 can be used as a final line. Further, a terminal end of the downstream first conveying path L2 and a beginning end of the upstream first conveying path L1 are connected by a linear inbound first conveying path L6 in parallel with these first conveying paths L1 and L2.

A pair of left and right guide rails 7a and 7b which wheels provided to respective longitudinal movement wheel units 8a to 8d, 9a to 9d, and 10a to 10d of the carriages 2 to 4 of the workpiece conveying traveling body 1 roll on are laid on the upstream first conveying path L1, the downstream first conveying path L2, and the inbound first conveying path L6. A pair of left and right guide rails 29a and 29b which wheels provided to the lateral movement wheel units 11a to 11d of the workpiece support carriage 2 roll on are laid on the outbound second conveying path L3 and the inbound second conveying path L4. Further, friction drives 30 to propel the workpiece conveying traveling body 1 via respective longitudinal movement friction drive surfaces 27a and 27b of the carriages 2 to 4 continuing across the entire length of the workpiece conveying traveling body 1 are juxtaposed on the upstream first conveying path L1, the downstream first conveying path L2, and the inbound first conveying path L6, as shown in FIGS. 1, 3, and 4. The friction drives 30 are each composed of motor-driven friction drive wheels 31a and 31b respectively pressure-contacted with the longitudinal movement friction drive surfaces 27a and 27b on both lateral sides.

Figure 7:
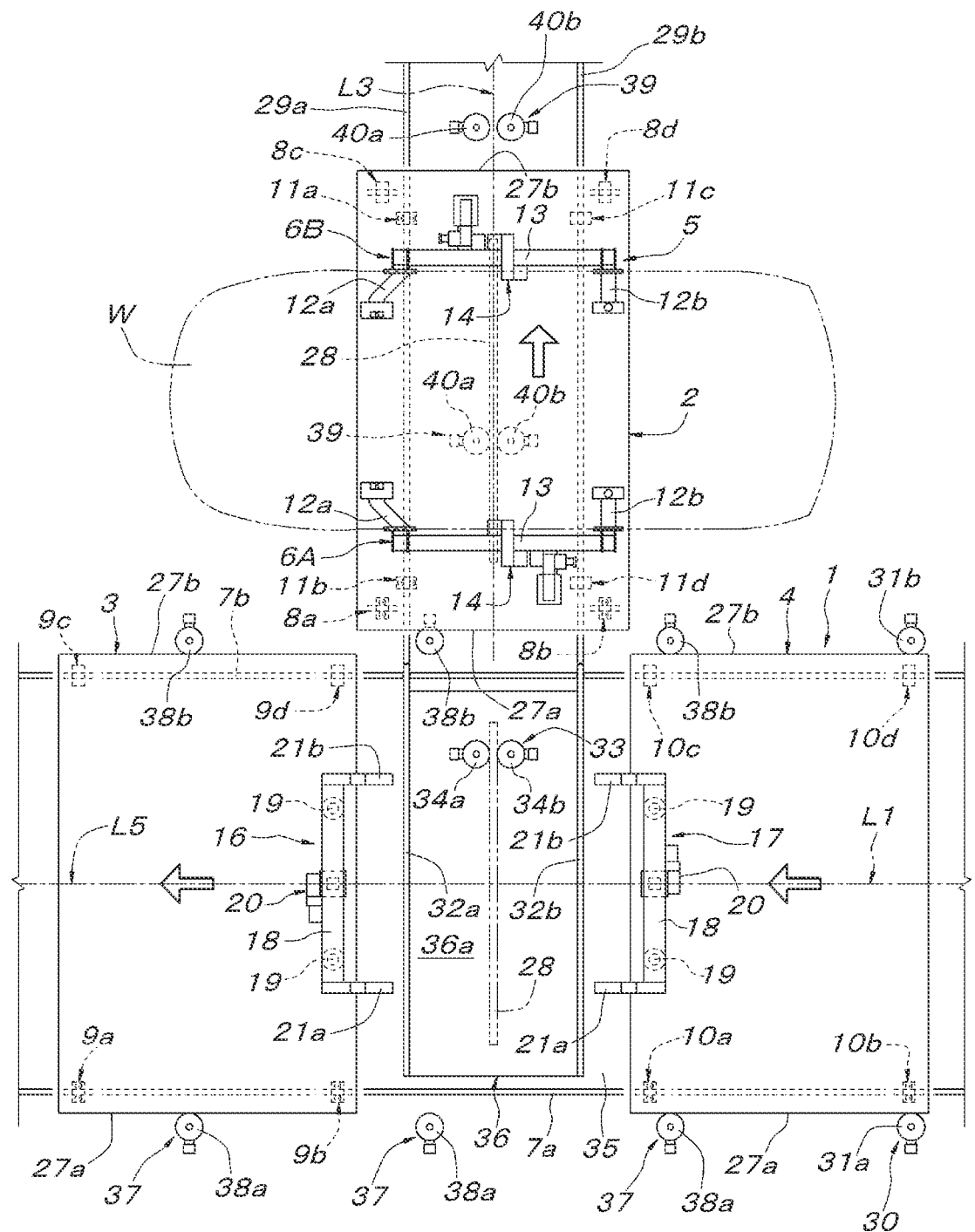
FIG. 7 is a plan view explaining branching and meeting of the workpiece support carriage at a branching point between the first and second conveying paths.
Figure 8:
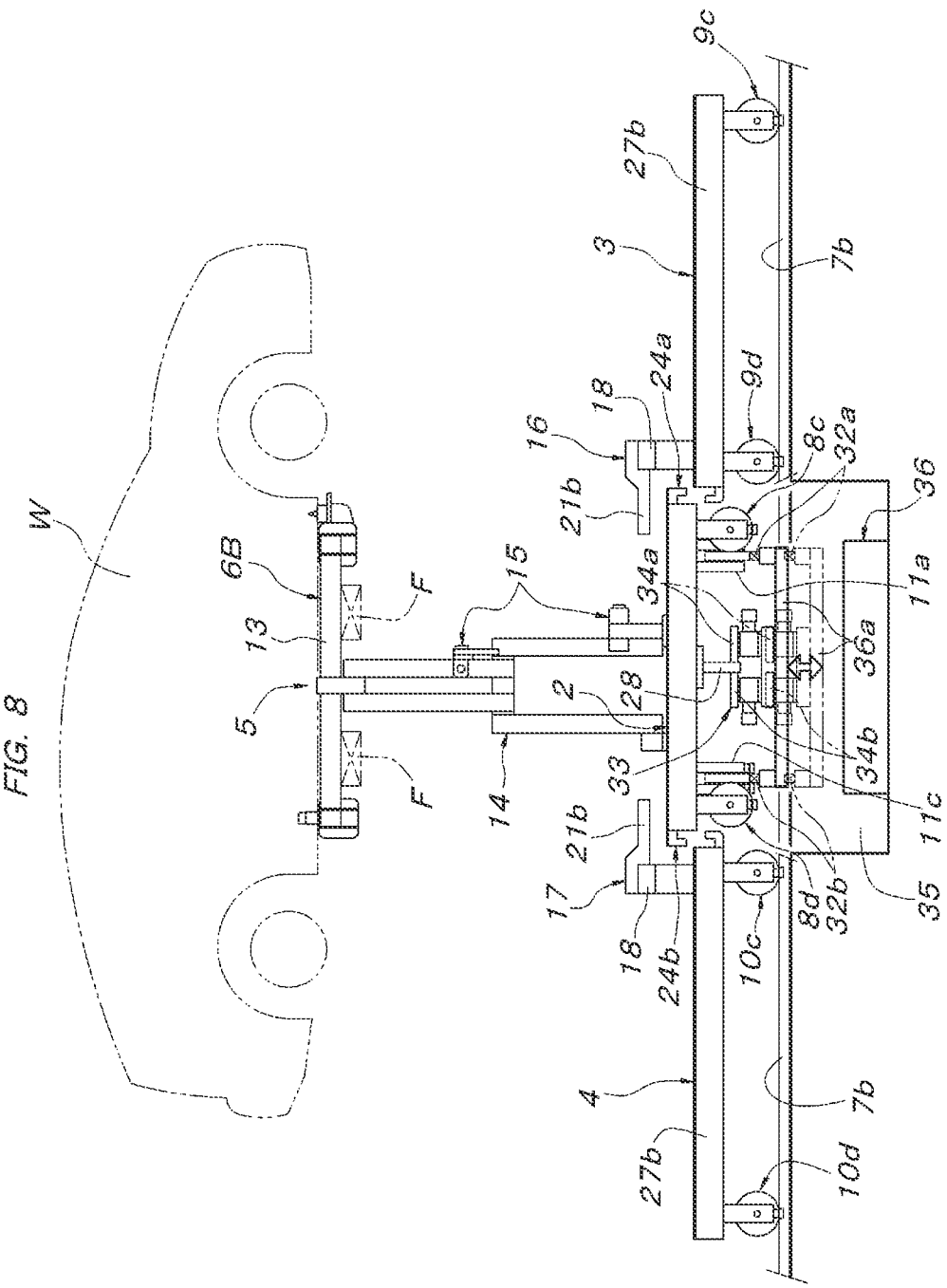
FIG. 8 is a side view of the same.
Figure 9:
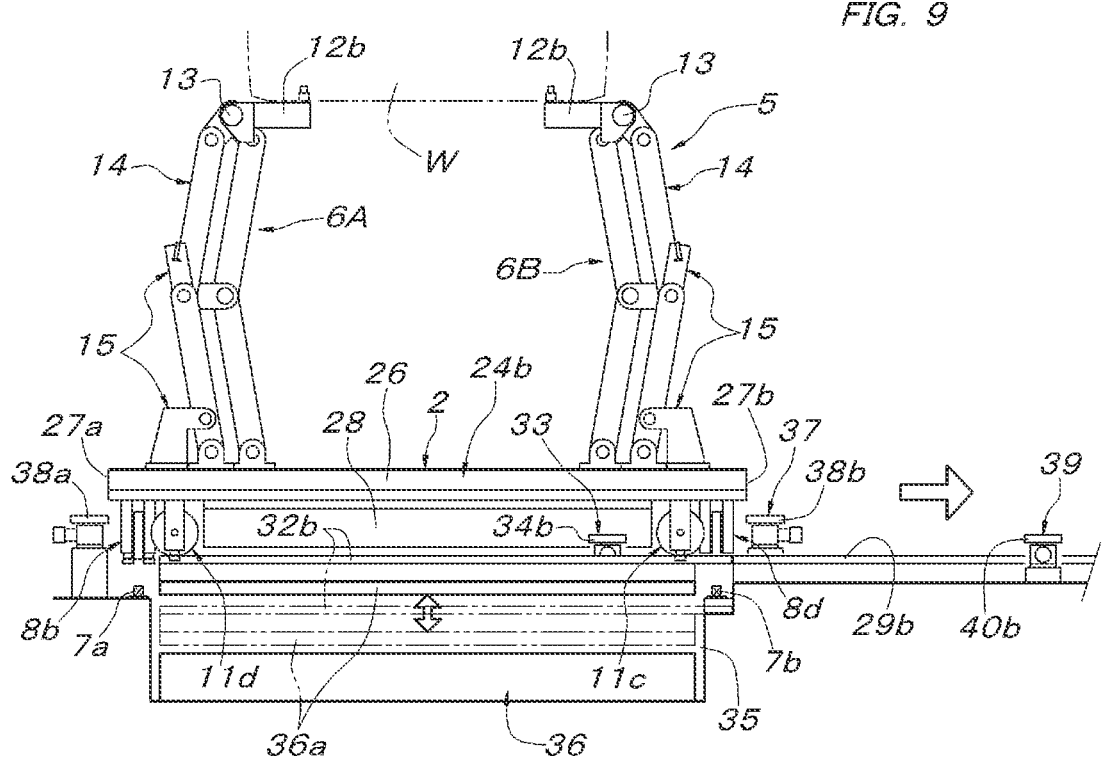
FIG. 9 is a front view of the same.

An installation interval in the traveling path direction between the friction drives 30 is set accordingly as the workpiece conveying traveling bodies 1 are driven to travel in a bumper to bumper state where front and rear workpiece conveying traveling bodies 1 abut against each other or as the workpiece conveying traveling bodies 1 are driven to travel one by one while keeping a predetermined spacing therebetween, as conventionally known. The workpiece conveying traveling body 1 driven by the motor-driven friction drive wheels 31a and 31b of the friction drives 30 travels the upstream first conveying path L1 toward the branching point P1 and stops at a fixed position where the workpiece support carriage 2 is positioned at the branching point P1. There are arranged at this branching point P1 a pair of left and right elevating guide rails 32a and 32b positioned immediately below the lateral movement wheel units 11a to 11d of the workpiece support carriage 2 of the workpiece conveying traveling body 1 having stopped at the fixed position and a vertically movable divergence friction drive 33 positioned immediately below the vicinity of one of the end portions of the friction driving strip plate member 28, which end portion is closer to the outbound second conveying path L3, as shown in FIGS. 7 to 9. The divergence friction drive 33 includes motor-driven friction drive wheels 34a and 34b pressure-contactable with both lateral surfaces of the friction driving strip plate member 28.

The elevating guide rails 32a and 32b and the divergence friction drive 33 are installed on an elevating base 36a of an elevating device 36 installed inside an underfloor pit 35 located immediately below the branching point P1. The elevating base 36a is supported by an elevation guide mechanism so as to be vertically and parallelly movable. The elevating device 36 drives the elevating base 36a to move up and down between a descent limit and an ascent limit by an appropriate actuator. The elevating guide rails 32a and 32b and divergence friction drive 33 having been lowered to the descent limit are located lower than the lateral movement wheel units 11a to 11d and friction driving strip plate member 28 of the workpiece support carriage 2 having approached the branching point P1 as shown by a virtual line in FIG. 8 and FIG. 9, so that the former do not interfere with the latter. Further, there are juxtaposed on the auxiliary carriage traveling path L5 from the branching point P1 to the meeting point P2 a plurality of auxiliary carriage driving friction drives 37 driving the auxiliary carriages 3 and 4 of the workpiece conveying traveling body 1 having stopped at the fixed position at the branching point P1 to the meeting point P2 while keeping a spacing between both auxiliary carriages 3 and 4. Each auxiliary carriage driving friction drive 37 has the same structure as the friction drive 30 and includes a pair of left and right motor-driven friction drive wheels 38a and 38b pressure-contacted with respective longitudinal movement friction drive surfaces 27a and 27b of the auxiliary carriages 3 and 4. The auxiliary carriage driving friction drives 37 are plurally arranged in parallel along the auxiliary carriage traveling path L5 at an interval shorter than the entire length in the traveling direction of the auxiliary carriages 3 and 4 (the entire length of respective longitudinal movement friction drive surfaces 27a and 27b of the carriages 3 and 4).

Once the workpiece conveying traveling body 1 reaches the branching point P1 and stops, the elevating device 36 is operated to raise the elevating guide rails 32a and 32b and the divergence friction drive 33 from the descent limit height to the ascent limit height. As a result of this, the elevating guide rails 32a and 32b vertically and parallelly lift up the workpiece support carriage 2 having stopped at the fixed position at the branching point P1 via respective wheels of the lateral movement wheel units 11a to 11d of the workpiece support carriage 2. At the same time, the friction driving strip plate member 28 of the workpiece support carriage 2 is relatively fitted between the paired motor-driven friction drive wheels 34a and 34b of the divergence friction drive 33, whereupon the paired motor-driven friction drive wheels 34a and 34b of the divergence friction drive 33 are pressure-contacted with both lateral surfaces of the friction driving strip plate member 28.

It is noted that the paired motor-driven friction drive wheels 34a and 34b of the divergence friction drive 33 are preferably configured to maintain a laterally opened state until reaching the ascent limit height and to close at the same time as reaching the ascent limit height and come into pressure-contact with both lateral surfaces of the friction driving strip plate member 28. As a matter of course, the divergence friction drive 33 can be installed on a fixed frame but not on the elevating base 36a so as for one of the paired motor-driven friction drive wheels 34a and 34b, the friction drive wheel 34a, which is positioned downstream the first conveying path L1 to be at a height enough to receive the friction driving strip plate member 28 of the workpiece support carriage 2 having stopped at the fixed position at the branching point P1 and so as for the other motor-driven friction drive wheel 34b which is positioned upstream the first conveying path L1 to be movable between an active position of holding the friction driving strip plate member 28 with the friction drive wheel 34a and a retreat position of being located lower than a moving path in the traveling direction of the upstream first conveying path L1 of the friction driving strip plate member 28.

In either case, when the workpiece support carriage 2 is lifted up to a fixed height by the elevating guide rails 32a and 32b at the branching point P1, end portions of the elevating guide rails 32a and 32b on the outbound second conveying path L3 side pass through notched divided portions provided to the guide rail 7b, one of the guide rails 7a and 7b of the upstream first conveying path L1 traversing the branching point P1, which guide rail 7b is located closer to the outbound second conveying path L3, and the end portions then reach a height of being connected with the paired left and right guide rails 29a and 29b laid on the outbound second conveying path L3, as shown in FIG. 9. Further, as lifted up to the fixed height, the workpiece support carriage 2 is separated higher than the friction drive wheel 38b among the motor-driven friction drive wheels 38a and 38b of the auxiliary carriage driving friction drives 37 arranged at a constant interval on the auxiliary carriage traveling path L5, which friction drive wheel 38b is located at a position of overlapping with a lateral moving path of the workpiece support carriage 2 diverged and laterally moving toward the outbound second conveying path L3 from the branching point P1. Furthermore, the connecting means 24a and 24b between the workpiece support carriage 2 and the auxiliary carriages 3 and 4 are brought into a connection released state where the engaging members 26 of the workpiece support carriage 2 are separated upward from the engaged members 25 of the auxiliary carriages 3 and 4.

Thus, the motor-driven friction drive wheels 34a and 34b of the divergence friction drive 33 are operated in this state, whereupon the workpiece support carriage 2 having been lifted up to the fixed height receives a propulsive force from the divergence friction drive 33 via the friction driving strip plate member 28 and moves laterally toward the outbound second conveying path L3, perpendicularly and horizontally from the branching point P1. The motor-driven friction drive wheel 38b of the auxiliary carriage driving friction drive 37, located at the height of overlapping with the lateral moving path of the workpiece support carriage 2 at this moment is provided at a position allowed to relatively pass below the workpiece support carriage 2 without interfering with the longitudinal movement wheel units 8a to 8d, lateral movement wheel units 11a to 11d, and friction driving strip plate member 28, etc., provided to the bottom portion of the workpiece support carriage 2 when the workpiece support carriage 2 moves laterally toward the outbound second conveying path L3.

The outbound and inbound second conveying paths L3 and L4 are juxtaposed with friction drives 39 driving the workpiece support carriage 2 via the friction driving strip plate member 28 thereof, as shown in FIGS. 9 to 12. The friction drives 39 each include motor-driven friction drive wheels 40a and 40b pressure-contacted with both lateral surfaces of the friction driving strip plate member 28. An installation interval in the traveling path direction between the friction drives 39 is set accordingly as the workpiece support carriages 2 are driven to travel in a bumper to bumper state where front and rear workpiece support carriages 2 abut against each other or as the workpiece support carriages 2 are driven to travel one by one while keeping a predetermined spacing therebetween in the same manner as the friction drives 30 juxtaposed on the first conveying paths L1, L2, and L6. When the workpiece support carriage 2 is sent into the outbound second conveying path L3 from the branching point P1 by the divergence friction drive 33, the friction driving strip plate member 28 of the workpiece support carriage 2 enters between motor-driven friction drive wheels 40a and 40b of the first friction drive 39 before the motor-driven friction drive wheels 34a and 34b of the divergence friction drive 33 are detached from the friction driving strip plate member 28. Subsequently, the workpiece support carriage 2 travels the outbound second conveying path L3 sideways by the friction drives 39 provided on the outbound second conveying path L3.

The workpiece support carriage 2 having transferred from the outbound second conveying path L3 to the inbound second conveying path L4 is driven by the friction drives 39 juxtaposed on the inbound second conveying path L4, and the carriage 2 travels the inbound second conveying path L4 in a direction reverse to when traveling the outbound second conveying path L3. The workpiece support carriage 2 is then sent out to the meeting point P2 to the downstream first conveying path L2 by the last friction drive 39 juxtaposed on the inbound second conveying path L4.

On the other hand, the front and rear two auxiliary carriages 3 and 4 having been left at the branching point P1 are sent out on the auxiliary carriage traveling path L5 up to the downstream meeting point P2 by the auxiliary carriage driving friction drives 37 after the workpiece support carriage 2 is sent out from the branching point P1 to the outbound second conveying path L3. More specifically, the auxiliary carriage driving friction drives 37 are plurally arranged in parallel along the auxiliary carriage traveling path L5 at an interval shorter than the entire length in the traveling direction of the auxiliary carriages 3 and 4 (the entire length of respective longitudinal movement friction drive surfaces 27a and 27b of the carriages 3 and 4). Thus, when the auxiliary carriage driving friction drives 37 are operated to drive respective auxiliary carriages 3 and 4 toward the meeting point P2 by the motor-driven friction drive wheels 38a and 38b pressure-contacted with respective both left and right longitudinal movement friction drive surfaces 27a and 27b of the auxiliary carriages 3 and 4, both the front and rear auxiliary carriages 3 and 4 travel on the auxiliary carriage traveling path L5 toward the downstream meeting point P2 while keeping a spacing therebetween as much as the length in the traveling direction of the upstream first conveying path L1 of the workpiece support carriage 2. The auxiliary carriage driving friction drives 37 are arranged so as to send the two auxiliary carriages 3 and 4 into both fixed positions before and after the meeting point P2. The two auxiliary carriages 3 and 4 are sent into the fixed positions before and after the meeting point P2 from the inbound second conveying path L4 to the downstream first conveying path L2 and then stop.

On the other hand, the meeting point P2 is provided with elevating guide rails, a meeting friction drive, and an elevating device moving those up and down, all identical to the elevating guide rails 32a and 32b, divergence friction drive 33, and elevating device 36 moving those up and down provided to the branching point P1, although the illustration is omitted. Thus, when the workpiece support carriage 2 is sent out to the meeting point P2 from the inbound second conveying path L4 by the last friction drive 39 in the state where the auxiliary carriages 3 and 4 are waiting at the two fixed positions before and after the meeting point P2 of the downstream first conveying path L2 as described above, the elevating guide rails, meeting friction drive, and elevating device moving those up and down provided to the meeting point P2 are operated by operations reverse to those of the elevating guide rails 32a and 32b, divergence friction drive 33, and elevating device 36 moving those up and down at the branching point P1, whereupon the workpiece support carriage 2 having been sent out from the inbound second conveying path L4 is taken over by the elevating guide rails at the ascent limit height by means of the meeting friction drive and then sent into a fixed position of the meeting point P2. After that, the elevating guide rails are lowered, and the longitudinal movement wheel units 8a to 8d of the workpiece support carriage 2 are transferred to both the left and right guide rails 7a and 7b of the downstream first conveying path L2 and also the meeting friction drive is escaped downward from the friction driving strip plate member 28 of the workpiece support carriage 2. Additionally, the engaging members 26 of the connecting means 24a and 24b at the workpiece support carriage 2 side are fitted into the engaged members 25 at the auxiliary carriages 3 and 4 sides from above.

Once the workpiece support carriage 2 is sent between the waiting front and rear two auxiliary carriages 3 and 4 from the inbound second conveying path L4 and the carriages 2 to 4 are respectively connected on the guide rails 7a and 7b of the downstream first conveying path L2 by the connecting means 24a and 24b thereupon being reconstituted to the original workpiece conveying traveling body 1 at the meeting point P2 in the afore-described manner, the friction drives 30 arranged on the downstream first conveying path L2 are operated, and the workpiece conveying traveling body 1 can be driven to travel on the downstream first conveying path L2. The workpiece conveying traveling body 1 having reached the terminal end of the downstream first conveying path L2 can be sent back to the upstream first conveying path L1 after being made to go through the inbound first conveying path L6.

When the workpiece conveying traveling body 1 with the auxiliary carriages 3 and 4 connected with both the front and rear of the workpiece support carriage 2 travels the circulation path composed of the upstream first conveying path L1, the downstream first conveying path L2, and the inbound first conveying path L6, as shown in FIG. 1 and FIG. 2, the workpiece (the automobile body) W having been supported by the workpiece high-position supporting means 5 on the central workpiece support carriage 2 is lowered by folding of the workpiece high-position supporting means 5 and is supported at a low position by the workpiece low-position supporting means 16 and 17 on the auxiliary carriages 3 and 4 positioned below the workpiece W. At that moment, the workpiece high-position supporting means 5 on the workpiece support carriage 2 is folded down under the workpiece W. However, the workpiece support arms 12a and 12b having supported the workpiece W are received by the support arms 21a and 21b of the workpiece low-position supporting means 16 and 17 on the auxiliary carriages 3 and 4 before the workpiece high-position supporting means 5 is completely folded down and reaches the lowest support height. Resultingly, the workpiece low-position supporting means 16 and 17 support the workpiece W at a predetermined low position via the workpiece support arms 12a and 12b of the workpiece high-position supporting means 5.

The workpiece W is supported at a low position by the workpiece low-position supporting means 16 and 17 on the auxiliary carriages 3 and 4 as described above, wherewith a worker can carry out a variety of works with respect to a peripheral side portion of the workpiece (the automobile body) W while getting on the workpiece conveying traveling body 1, by utilizing a wide working floor formed by the three carriages 2 to 4 lined in the traveling direction and stretching out horizontally from the entire periphery of the workpiece (the automobile body) W. As a matter of course, the workpiece high-position supporting means 5 at this moment is only positioned while the elevating support units 6A and 6B thereof are folded down under the workpiece W and the rod-shaped support members 13 thereof are close to both lateral sides of the workpiece W. Thus, a variety of works with respect to the peripheral side portion of the workpiece W can be performed safely and easily as compared with the case when large columns are located at both sides of the workpiece W.

The workpiece conveying traveling body 1 traveling on the upstream first conveying path L1 is once stopped at a fixed stop position having been set just before the branching point P1 from the upstream first conveying path L1 to the outbound second conveying path L3. At this fixed stop position, lifters for switching the workpiece high-position supporting means 5 into the rising posture are installed in such a manner as to be positioned at both lateral sides of the workpiece support carriage 2 of the workpiece conveying traveling body 1 having been stopped at the fixed stop position. These lifters include running forks F (see virtual lines in FIG. 3 and FIG. 8) horizontally movable in and out with respect to the underside of respective rod-shaped support members 13 of the paired left and right elevating support units 6A and 6B of the workpiece high-position supporting means 5. The running forks F are moved up while entered under the rod-shaped support members 13 of the workpiece high-position supporting means 5 in the folded posture having been supported by the workpiece low-position supporting means 16 and 17 of the auxiliary carriages 3 and 4, whereupon the workpiece high-position supporting means 5 is switched into the rising posture and is automatically locked by the lock means 15. In switching the workpiece high-position supporting means 5 from the folded posture into the rising posture, it may be configured such that the workpiece W is once removed from on the workpiece high-position supporting means 5 by a dedicated transfer device and then returned onto the workpiece high-position supporting means 5 after the workpiece high-position supporting means 5 is switched into the rising posture. However, the workpiece high-position supporting means 5 may be switched into the rising posture while supporting the workpiece W, if possible.

Figure 10:
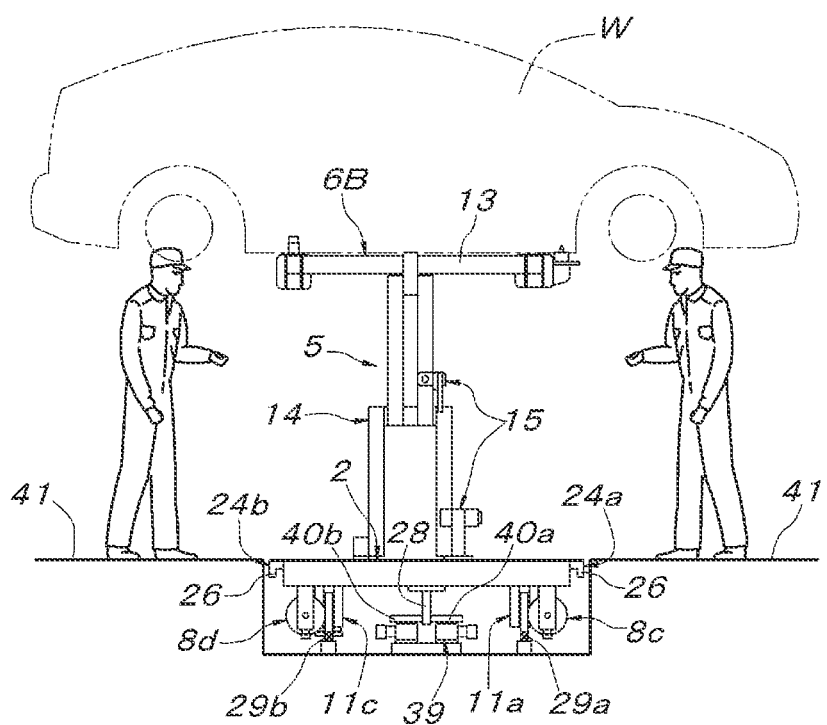
FIG. 10 is a front view showing the workpiece support carriage on the second conveying path.
Figure 12:
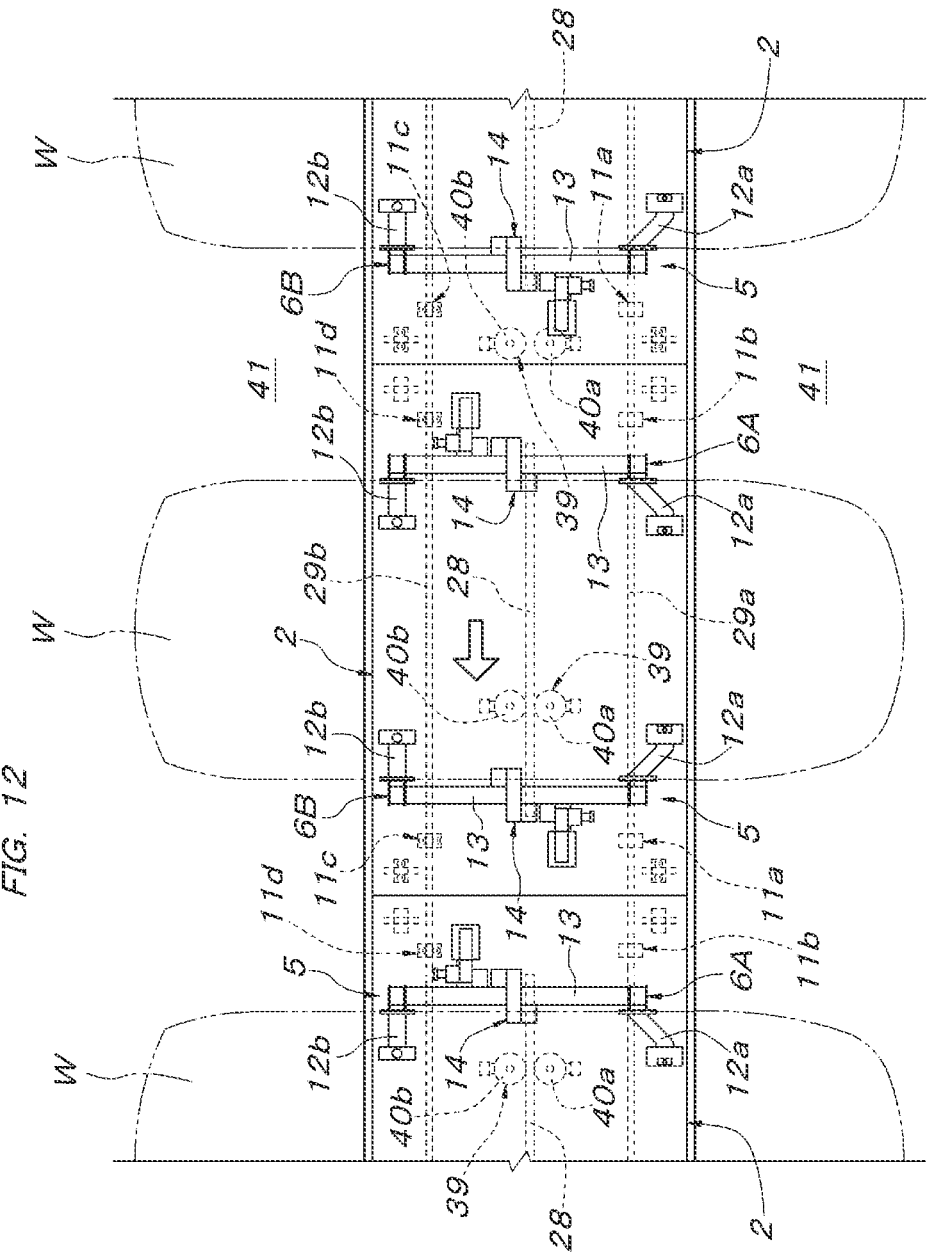
FIG. 12 is a plan view of the same.

The workpiece support carriage 2 having been perpendicularly and horizontally sent out to the outbound second conveying path L3 in the above state is conveyed perpendicularly sideways on the outbound second conveying path L3 and the inbound second conveying path L4 continuing thereto while supporting the workpiece W at a high position with the workpiece high-position supporting means 5 in the rising posture. At this moment, both the front and rear end portions of the workpiece (the automobile body) W largely project from the workpiece support carriage 2 laterally with respect to the conveying direction as shown in FIGS. 10 to 12. Thus, if fixed working floors 41 are laid on respective lateral sides of the outbound and inbound second conveying paths L3 and L4 at substantially the same height as the floor surface of the workpiece support carriage 2, as shown in FIG. 6, then work carriages loaded with large assembly parts such as engines and axel units are driven to travel on the fixed working floors 41 to positions under both the front and rear end portions of the workpiece (the automobile body) W and then the work of attaching the large assembly parts on the work carriages to bottom portions of both the front and rear end portions of the workpiece (the automobile body) W can be performed on the safe fixed working floors 41.

The workpiece conveying traveling body 1 having been sent from the inbound second conveying path L4 to the meeting point P2 and combined with the auxiliary carriages 3 and 4 into the original workpiece conveying traveling body 1 again is sent out to the downstream first conveying path L2 in that state. The workpiece conveying traveling body 1 is once stopped at a fixed stop position having been set at the beginning end portion of the downstream first conveying path L2, and the workpiece high-position supporting means 5 in the rising posture is switched into the folded posture by lifters installed at the fixed stop position. The lifters at the fixed stop position having been set at the beginning end portion of the downstream first conveying path L2 include lock releasing means to switch the lock means 15 having locked the elevating support units 6A and 6B in the rising posture of the workpiece high-position supporting means 5 in the rising posture into a lock released state while supporting the rod-shaped support members 13 of the elevating support units 6A and 6B by the running forks F. The lock-released elevating support units 6A and 6B with the rod-shaped support members 13 thereof supported by the running forks F are folded inward by descent of the running forks F, and the workpiece support arms 12a and 12b of the elevating support units 6A and 6B are transferred onto the support arms 21a and 21b of the workpiece low-position supporting means 16 and 17 of the auxiliary carriages 3 and 4. The support arms 21a and 21b of the workpiece low-position supporting means 16 and 17 at that moment are set at predetermined heights in advance. The operation of folding this workpiece high-position supporting means 5 from the rising posture may be performed in the state where the workpiece W is kept supported and may be performed in the state where the workpiece W is temporarily retreated from the workpiece high-position supporting means 5, as described above.

The works with respect to the peripheral side portion of the workpiece W having been supported at a predetermined low position by the workpiece low-position supporting means 16 and 17 of the auxiliary carriages 3 and 4 can be performed when the workpiece conveying traveling body 1 with the three carriages 2 to 4 integrated travels the upstream and downstream first conveying paths L1 and L2, as described above. However, the support height of the workpiece W can be changed in accordance with details of the works. More specifically, the elevation drive means 20 of the workpiece low-position supporting means 16 and 17 are operated to move up and down the rod-shaped support members 18, and the height of the support arms 21a and 21b having supported the workpiece W via the elevating support units 6A and 6B (the workpiece support arms 12a and 12b) of the workpiece high-position supporting means 5 is changed, whereby the support height of the workpiece W can be changed. As a matter of course, the elevating support units 6A and 6B of the workpiece high-position supporting means 5 also rise and fall with change in workpiece support height of the workpiece low-position supporting means 16 and 17. When the support height of the workpiece low-position supporting means 16 and 17 is lowered more than the lowest support height at which the elevating support units 6A and 6B of the workpiece high-position supporting means 5 take a completely folded posture, the workpiece W is supported at the lowest support height only by the elevating support units 6A and 6B in the completely folded posture. Then, the workpiece low-position supporting means 16 and 17 become free.

Figure 13:
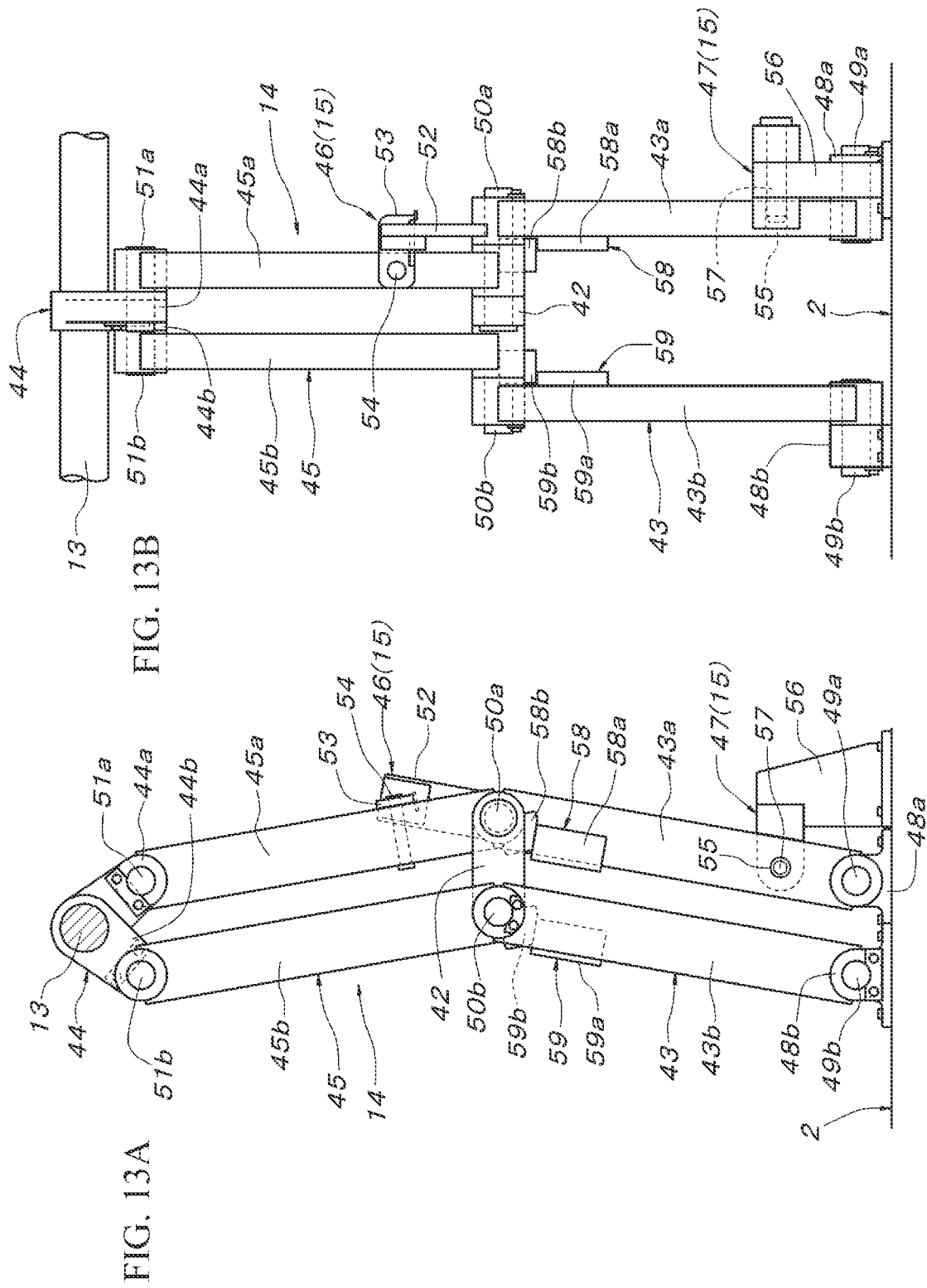
FIG. 13A is a side view showing a structure of one side of one of the units of workpiece high-position supporting means provided on the workpiece support carriage.
FIG. 13B is a front view of the same.

The specific structure and operation of the elevating support units 6A and 6B constituting the workpiece high-position supporting means 5 are described in detail in Japanese Published Unexamined Patent Application No. 2011-088697 filed earlier by the present applicant. Only the structure will be described briefly based on FIG. 13. The center-folding double link mechanism 14 of each elevating support unit 6A or 6B is composed of a lower parallel link pair 43 interposed between the workpiece support carriage 2 and an intermediate link member 42, and an upper parallel link pair 45 interposed between the intermediate link member 42 and an upper link member 44. Each center-folding double link mechanism 14 is juxtaposed with a lock means 15 composed of a first lock means 46 to control an angle between the lower parallel link pair 43 and the upper parallel link pair 45 and a second lock means 47 to control an angle between the lower parallel link pair 43 and the workpiece support carriage 2.

The lower parallel link pair 43 is composed of two links 43a and 43b. Both the links 43a and 43b have one ends pivotally supported so as to be laterally swingable by longitudinal and horizontal spindles 49a and 49b on bearings 48a and 48b fixed on the workpiece support carriage 2 as displaced longitudinally and laterally. The upper parallel link pair 45 is composed of two links 45a and 45b arranged in such a manner as to sandwich the intermediate link member 42. One end of one of the links 45a, a free end of one of the links 43a of the lower parallel link pair 43, and one end of the intermediate link member 42 arranged laterally horizontal are pivotally supported so as to be swingable and connected by a common longitudinal and horizontal spindle 50a. At the same time, one end of the other link 45b, a free end of the other link 43b of the lower parallel link pair 43, and the other end of the intermediate link member 42 arranged laterally horizontal are pivotally supported so as to be swingable and connected by a common longitudinal and horizontal spindle 50b. The upper link member 44 of the center-folding double link mechanisms 14 is fixed at a substantially central part in the longitudinal direction of the rod-shaped support member 13 and includes bearing portions 44a and 44b below the rod-shaped support member 13 at bilaterally symmetrical positions with respect to the rod-shaped support member 13. The other ends of both the links 45a and 45b of the upper parallel link pair 45 are pivotally supported so as to be swingable and connected by respective longitudinal and horizontal spindles 51a and 51b on the bearing portions 44a and 44b of the upper link member 44.

As configured above, each center-folding double link mechanism 14 has the paired left and right spindles 49a and 49b on the workpiece support carriage 2 side and the paired left and right spindles 50a and 50b on the intermediate link member 42 side positioned at respective vertices of a lower parallelogram and also has the paired left and right spindles 50a and 50b on the intermediate link member 42 side and the paired left and right spindles 51a and 51b on the rod-shaped support member 13 side positioned at respective vertices of an upper parallelogram, when viewed from the front (FIG. 13A). In a side view (FIG. 13B), the links 45a and 45b of the upper parallel link pair 45 are located in parallel while adjoining both outer sides of the intermediate link member 42, and the links 43a and 43b of the lower parallel link pair 43 are located in parallel while adjoining both outer sides of the links 45a and 45b.

The lock means 15 juxtaposed to each center-folding double link mechanism 14 will be described. The first lock means 46 constituting this lock means 15 is composed of a locked member 52 having a distal end cut into a recessed portion, and a locking piece 53 fittable to and detachable from the recessed portion. The locked member 52 is formed of a strip plate fixedly projected in an extending direction of the link 43a of the lower parallel link pair 43 from the end portion on the intermediate link member 42 side of the link 43a. The locking piece 53 is pivotally supported on the link 45a of the upper parallel link pair 45 by a spindle 54 orthogonal to the longitudinal direction of the link 45a and parallel to a plate surface of the locked member 52. The second lock means 47 constituting the lock means 15 is composed of a locked hole 55 provided in the vicinity of the lower end of the link 43a of the lower parallel link pair 43 so as to penetrate longitudinally and horizontally and a lock pin 57 supported fittably and detachably with respect to the locked hole 55 by a support member 56 mounted on the workpiece support carriage 2.

Additionally, each center-folding double link mechanism 14 is juxtaposed with stoppers 58 and 59 which limit an expansion angle of the upper parallel link pair 45 with respect to the lower parallel link pair 43. The stopper 58 is composed of a stopper member 58a fixed on a lateral surface of the link 43a and a stopper member 58b fixed on a peripheral surface of the end portion on the intermediate link member 42 side of the link 45a. Abutment of both the stopper members 58a and 58b limits an expansion angle between the link 43a of the lower parallel link pair 43 and the link 45a of the upper parallel link pair 45. The stopper 59 is composed of a stopper member 59a fixed on a lateral surface of the link 43b and a stopper member 59b fixed on a peripheral surface of the end portion on the intermediate link member 42 side of the link 45b. Abutment of both the stopper members 59a and 59b limits an expansion angle between the link 43b of the lower parallel link pair 43 and the link 45b of the upper parallel link pair 45. It is a matter of course that the expansion angle between the links 43a and 45a and expansion angle between the links 43b and 45b limited by both the stoppers 58 and 59 are identical. Further, either one of the stoppers 58 and 59 may be employed alone.

FIG. 13A and FIG. 13B merely show the basic structure of the elevating support units 6A and 6B provided with the center-folding double link mechanisms 14. The elevating support units 6A and 6B can be modified as described in the earlier patent application. As a matter of course, a rise-fall driving actuator can be incorporated into the above-configured elevating support units 6A and 6B.

Figure 14:
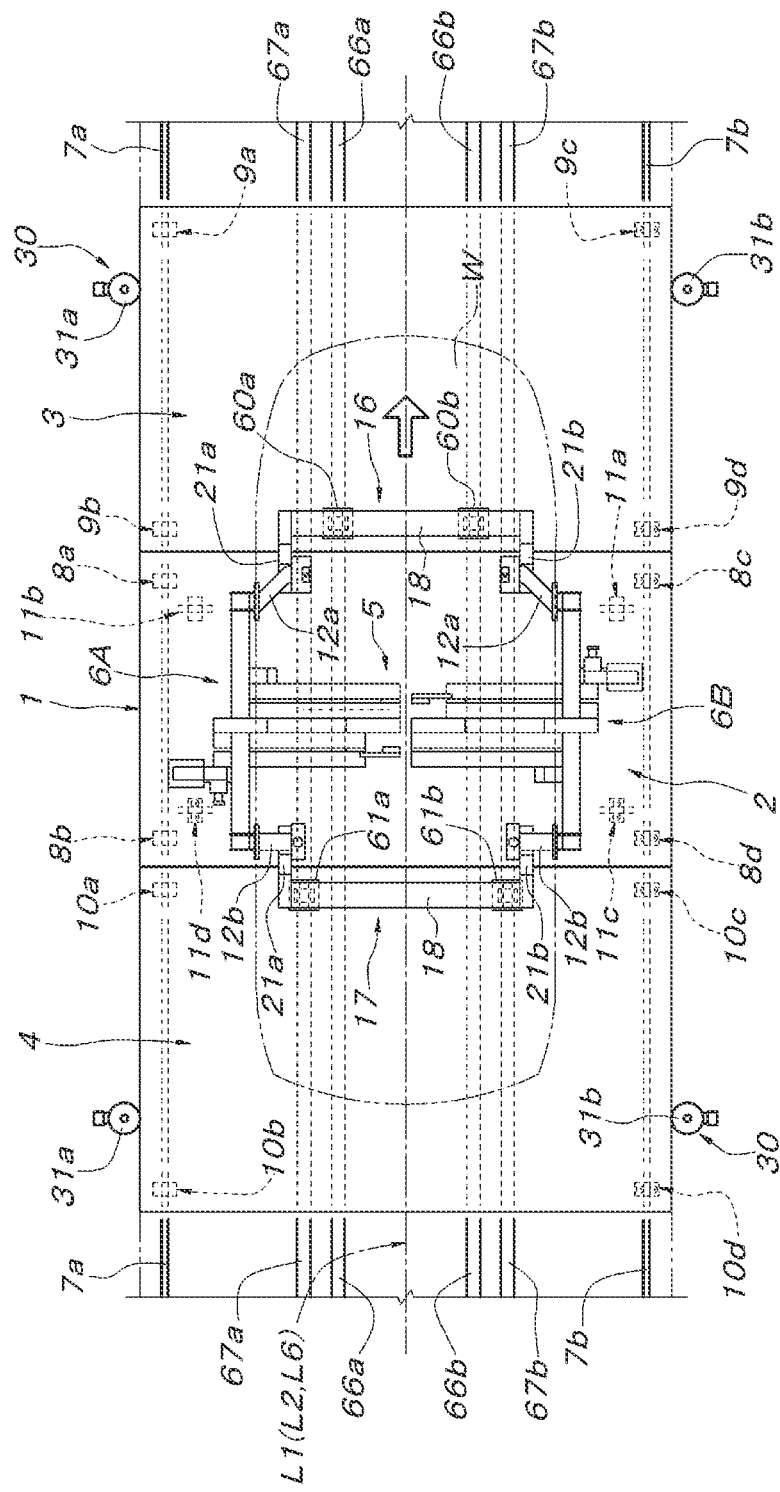
FIG. 14 is a plan view of an entire workpiece conveying traveling body showing the second embodiment of the present invention.
Figure 15:
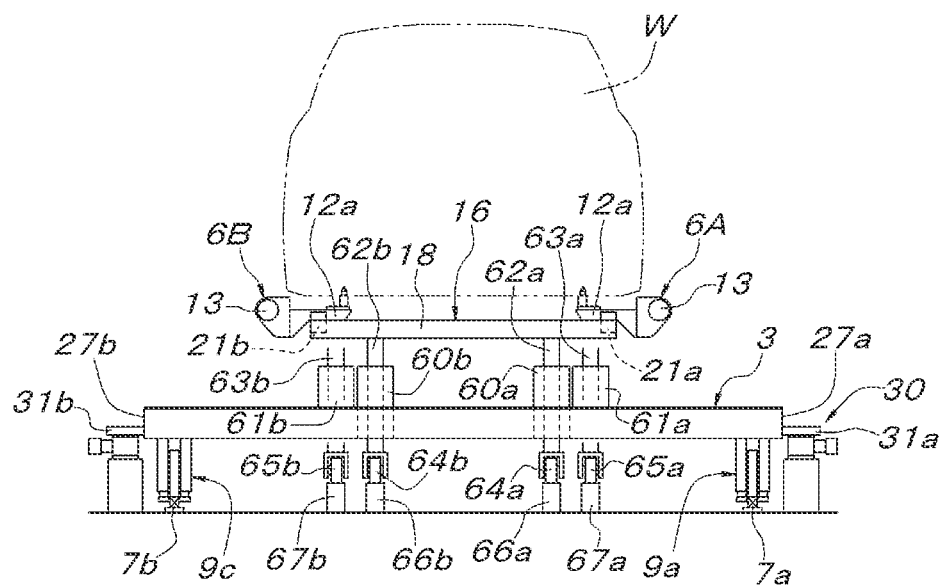
FIG. 15 is a front view showing an auxiliary carriage of the same.

Subsequently, another embodiment of the workpiece low-position supporting means 16 and 17 on the auxiliary carriages 3 and 4 will be described. The workpiece low-position supporting means 16 and 17 as shown in FIG. 14 and FIG. 15 are configured such that the rod-shaped support members 18 can be moved up and down by cam rails laid on the floor surface along the traveling path and held at a predetermined support height, instead of the elevation drive means 20 of the above embodiment. More specifically, the rod-shaped support members 18 of the workpiece low-position supporting means 16 and 17 are configured to have two places near both longitudinal ends thereof attached with elevating rods 62a, 62b and 63a, 63b vertically penetrating a pair of left and right elevation guides 60a, 60b and 61a, 61b attached to the auxiliary carriages 3 and 4. Cam follower rollers 64a, 64b and 65a, 65b respectively pivotally supported at lower ends of the elevating rods 62a to 63b are configured to roll on a pair of left and right cam rails 66a, 66b and 67a, 67b laid on the floor surface along the traveling path. As a matter of course, both rod-shaped support members 18 of the workpiece low-position supporting means 16 and 17 need to be moved up and down synchronously so as to always keep the same height. Thus, the cam rails 66a and 66b to move up and down and control the workpiece low-position supporting means 16 and the cam rails 67a and 67b to move up and down and control the workpiece low-position supporting means 17 have the same shape and the same size and are laid while displaced in the carriage traveling direction by an interval in the carriage traveling direction between the workpiece low-position supporting means 16 and 17.

According to the workpiece low-position supporting means 16 and 17 controlled by cam rails, the height of the cam rails 66a, 66b and 67a, 67b is changed in each specific section along with the traveling of the workpiece conveying traveling body 1, whereupon the height of the workpiece W supported by the workpiece low-position supporting means 16 and 17 can be changed automatically in each section.

Figure 16:
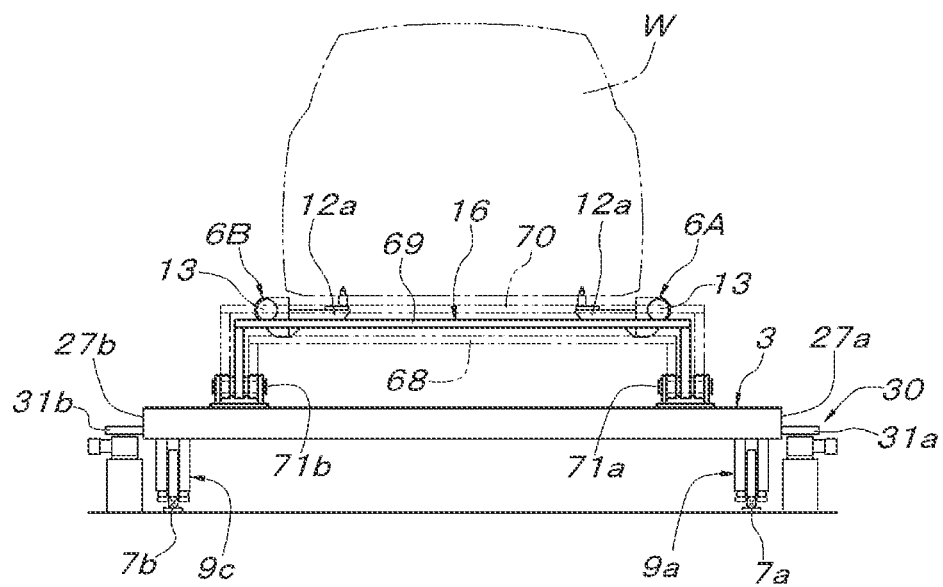
FIG. 16 is a front view of an auxiliary carriage showing the third embodiment of the present invention.
Figure 17:
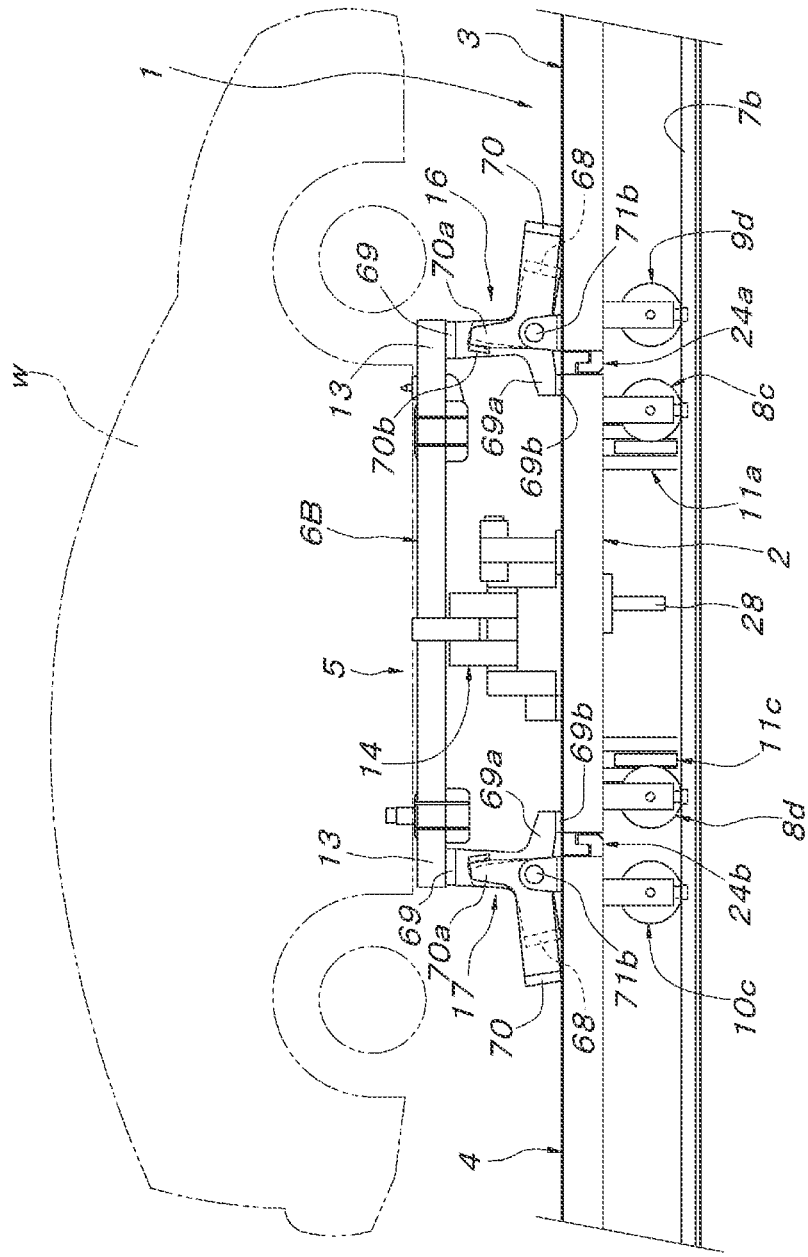
FIG. 17 is a side view of an entire workpiece conveying traveling body of the same.
Figure 18A:
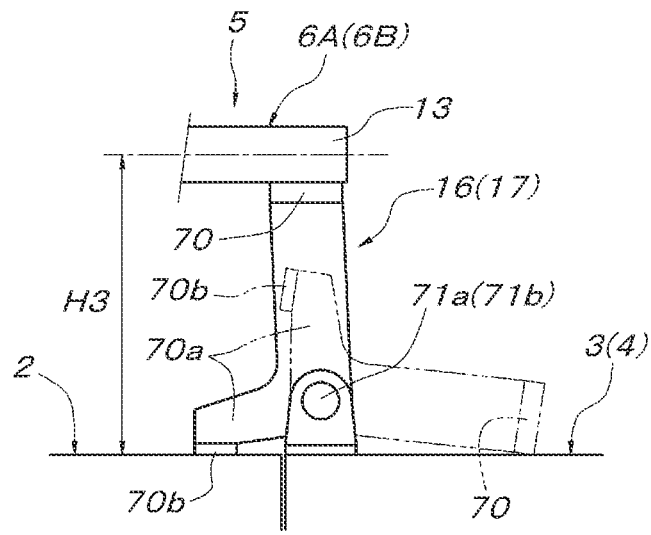
FIGS. 18A to 18C are side views explaining operations of workpiece low-position supporting means of the same.
Figure 18B:
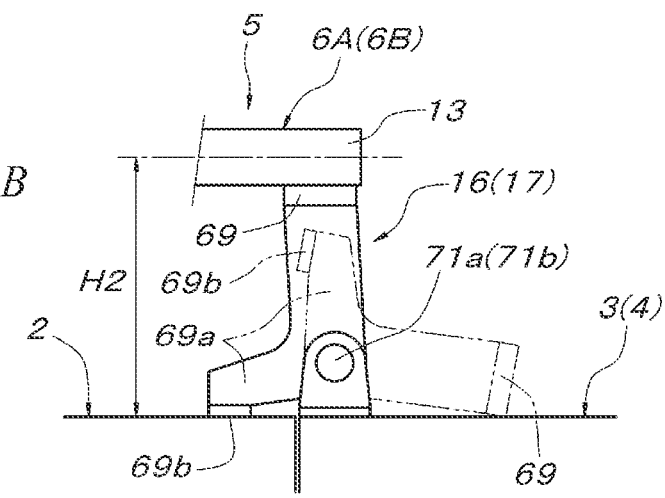
Figure 18C:
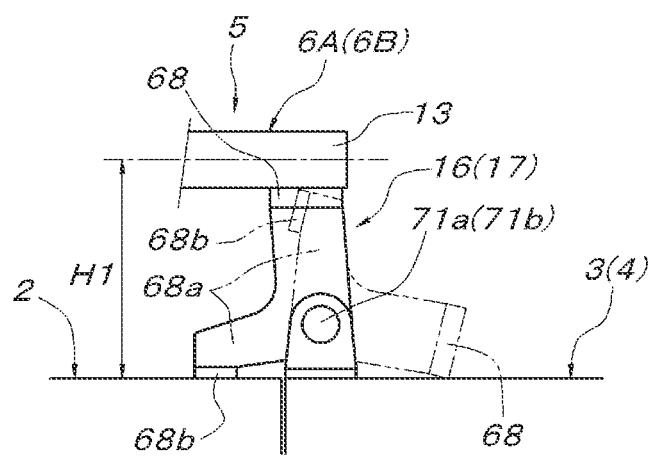

Still another embodiment of the workpiece low-position supporting means 16 and 17 as shown in FIGS. 16 to 18 will be described. In these workpiece low-position supporting means 16 and 17, three workpiece support bodies 68 to 70 having different support heights H1 to H3 are used. The workpiece support bodies 68 to 70 are formed of portal frame materials mutually fitted in such a manner that the one with a higher support height is located at an outer side. The workpiece support bodies 68 to 70 have both leg portions whose lower ends are pivotally supported on end portions adjacent to the workpiece support carriage 2 of the auxiliary carriages 3 and 4 by a pair of left and right laterally horizontal spindles 71a and 71b so as to rise and fall. From both leg portions of the respective workpiece support bodies 68 to 70, there are continuously provided stopper arms 68a to 70a which extend above the adjacent workpiece support carriage 2 when the respective workpiece support bodies 68 to 70 assume a supporting posture of rising. Contact portions 68b to 70b which abut against the upper surface of the workpiece support carriage 2 are provided on the underside of the stopper arms 68a to 70a.

According to the above configured workpiece low-position supporting means 16 and 17, one of the workpiece support bodies 68 to 70 which is selected based on the height H1 to H3 at which the workpiece W is to be supported, for example, the workpiece support body 69 with an intermediate support height H2 is rotated and raised about the laterally horizontal spindles 71a and 71b, and the contact portions 69b of the stopper arms 69a are made to abut against the upper surface of the adjacent workpiece support carriage 2. Other workpiece support body 68 with the support height H1 and workpiece support body 70 with the support height H3 are made to rotate and fall down about the laterally horizontal spindles 71a and 71b toward upper surfaces of the auxiliary carriages 3 and 4. The rising posture of the workpiece support body 69 and the fallen-down posture of the workpiece support bodies 68 and 70 are respectively held by gravity. To change the workpiece support height, the workpiece support body 68 with the lowest support height H1 or the workpiece support body 70 with the highest support height H3 is raised, and the contact portions 68b of the stopper arms 68a or the contact portions 70b of the stopper arms 70a are made to abut against the upper surface of the adjacent workpiece support carriage 2. The workpiece support body 69 with the intermediate support height H2 is switched into the fallen-down posture. The workpiece support bodies 68 to 70 are configured such that upper ends (workpiece support portions) thereof are positioned slightly nearer to the workpiece support carriage 2 side than positions immediately above the laterally horizontal spindles 71a and 71b when taking the rising posture.

In the above configuration, when folded down, both the elevating support units 6A and 6B of the workpiece high-position supporting means 5 of the workpiece support carriage 2 are supported by one of the workpiece support bodies 68 to 70 of the workpiece low-position supporting means 16 and 17, which workpiece support body is held in the rising posture. In the embodiment shown, both front and rear protruding end portions of the rod-shaped support members 13 of both the elevating support units 6A and 6B are configured to be supported by the workpiece support bodies 68 to 70. Thus, the workpiece W having been supported by the elevating support units 6A and 6B in the folded posture of the workpiece high-position supporting means 5 is supported at the support height of the workpiece low-position supporting means 16 and 17 on the auxiliary carriages 3 and 4 by which the elevating support units 6A and 6B are supported via the rod-shaped support members 13, that is, at the support height H1 to H3 of one workpiece support body having been held in the rising posture among the workpiece support bodies 68 to 70 of the workpiece low-position supporting means 16 and 17. At that moment, a downward load acted upon the workpiece support body 68 to 70 in the rising posture which supports the workpiece W via the elevating support units 6A and 6B is not only received by the end portions of the auxiliary carriages 3 and 4 but also supported on both end portions of the workpiece support carriage 2 via the contact portions 68b to 70b of the stopper arms 68a to 70a. As a result, the stability of the auxiliary carriages 3 and 4 is enhanced.

It is noted that the configuration of the workpiece low-position supporting means 16 and 17 provided to the auxiliary carriages 3 and 4 should not be restricted to those of the afore-described respective embodiments. A variety of elevation support devices as referred to as for example a jack, a lifter, in which switching of the support height is performed by manpower, a fluid pressure cylinder drive, a motor drive, or the like can be used. Additionally, although illustration is omitted, it can be configured so that the support height of the workpiece low-position supporting means 16 and 17 of the auxiliary carriages 3 and 4 is changed by elevation drive means installed on the floor side while the workpiece conveying traveling body 1 is stopped at the fixed stop position on the traveling path. In this case, it needs to be configured such that the workpiece conveying traveling body 1 can pass above the elevation drive means on the floor side without problems when the elevation drive means are in a stand-by state. Further, the workpiece low-position supporting means 16 and 17 changeable in support height by being moved up and down by the elevation drive means on the floor side are configured to be locked automatically at a changed support height. The locking is configured to be released automatically when the workpiece low-position supporting means 16 and 17 are moved up and down by the elevation drive means on the floor side. As a matter of course, it may be configured such that elevating rods which move in synchronization with the vertically moving workpiece support portions of the workpiece low-position supporting means 16 and 17 are projected under the auxiliary carriages 3 and 4 and the elevating rods are moved up and down by the elevation drive means on the floor side. Since the end portions of the auxiliary carriages 3 and 4 provided with the workpiece low-position supporting means 16 and 17 are located under the supported workpiece W, such a configuration is also possible that the end portions of the auxiliary carriages 3 and 4 are provided with openings, through which elevating members of the elevation drive means on the floor side move vertically, and that the elevating members directly support and move up and down the vertically moving workpiece support portions of workpiece low-position supporting means 16 and 17.

INDUSTRIAL APPLICABILITY

The workpiece conveyance device of the present invention can be utilized effectively as an automobile assembly line composed of a trim line and a final line where works with respect to a peripheral side portion of an automobile body are performed and a chassis line where assembling work of large assembly parts conveyed by carriages, such as engines and axel units, with respect to the underside of both front and rear end portions of the automobile body is performed.

What is claimed is:

1. A workpiece conveyance device comprising:
a workpiece conveying path comprising a first conveying path and a second conveying path branched off perpendicularly and horizontally with respect to the first conveying path;
a workpiece conveying traveling body traveling on the workpiece conveying path and composed of a workpiece support carriage which supports a longitudinal central portion of a workpiece whose longitudinal direction is parallel to the first conveying path and two auxiliary carriages releasably connectable to a front and rear in a traveling direction of the first conveying path of the workpiece support carriage and are positioned below both longitudinal end portions of the workpiece;
a workpiece conveying traveling body driving means juxtaposed on the first conveying path to drive the workpiece support carriage and the two auxiliary carriages to travel integrally;
a carriage diverging means arranged at a branching point between the first conveying path and the second conveying path so as to leave the two auxiliary carriages on the first conveying path and to diverge and introduce only the workpiece support carriage perpendicularly and horizontally into the second conveying path; and
a workpiece support carriage driving means juxtaposed on the second conveying path to drive the workpiece support carriage to travel perpendicularly and horizontally with respect to the traveling direction of the workpiece support carriage on the first conveying path;
wherein the workpiece support carriage is provided with a workpiece high-position supporting means configured to be switchable between a rising posture of supporting the workpiece at a high position and a fallen-down folded posture under the workpiece and on the workpiece support carriage, and the two auxiliary carriages are provided with workpiece low-position supporting means configured to individually support front and rear two places in the longitudinal direction of the workpiece under the workpiece and at a position higher than the workpiece high-position supporting means in the folded posture.

2. The workpiece conveyance device according to claim 1, wherein the workpiece high-position supporting means on the workpiece support carriage is moved up and down by a lifter located alongside the traveling path while supporting the workpiece, and the workpiece high-position supporting means is provided with a lock means to lock in the rising posture of supporting the workpiece at a high position.

3. The workpiece conveyance device according to claim 1, wherein the workpiece low-position supporting means on the two auxiliary carriages support the workpiece via the workpiece high-position supporting means on the workpiece support carriage.

4. The workpiece conveyance device according to claim 1, wherein the workpiece low-position supporting means on the two auxiliary carriages are of a variable-support-height structure which can support the workpiece at a plurality of heights higher than the workpiece high-position supporting means in the folded posture.

5. The workpiece conveyance device according to claim 1, wherein the workpiece low-position supporting means on the two auxiliary carriages are provided with vertically movable support members, and the support members are held at a workpiece support height by cam rails laid on the traveling path side.

6. The workpiece conveyance device according to claim 1, wherein the workpiece low-position supporting means on the two auxiliary carriages are provided with workpiece support bodies which are pivotally supported on end portions of the respective auxiliary carriages adjacent to the workpiece support carriage so as to rise and fall, and the workpiece support bodies are continuously provided with contact portions which abut on the adjacent workpiece support carriage when the workpiece support bodies are in a workpiece supporting posture.

7. The workpiece conveyance device according to claim 1, wherein the front and rear two auxiliary carriages and have the same lateral width and length, and the lateral width thereof is equal to that of the workpiece support carriage and the length thereof in the traveling direction of the first conveying path is sufficient to protrude more forwardly and rearwardly outward than both the front and rear ends of the workpiece projecting forward and rearward from the workpiece support carriage when viewed in plan and sufficient to provide a working floor to allow a worker to walk thereon outside both the front and rear ends of the workpiece.

* * * * *